United States Patent
Hammitt et al.

(10) Patent No.: US 7,793,008 B2
(45) Date of Patent: Sep. 7, 2010

(54) AMBA MODULAR MEMORY CONTROLLER

(75) Inventors: Gregory F. Hammitt, Eagan, MN (US);
John M. Nystuen, Burnsville, MN (US);
Steven M. Emerson, Chanhassen, MN (US)

(73) Assignee: LSI Corporation, Milpitas, CA (US)

( * ) Notice: Subject to any disclaimer, the term of this patent is extended or adjusted under 35 U.S.C. 154(b) by 11 days.

(21) Appl. No.: 11/402,102

(22) Filed: Apr. 11, 2006

(65) Prior Publication Data

US 2006/0190658 A1 Aug. 24, 2006

Related U.S. Application Data

(62) Division of application No. 10/325,383, filed on Dec. 20, 2002, now Pat. No. 7,114,041.

(51) Int. Cl.
*G06F 3/00* (2006.01)

(52) U.S. Cl. .............................. 710/8; 710/10; 710/20; 710/33; 710/107; 710/113

(58) Field of Classification Search .................. 710/8, 710/10, 20, 21, 33, 37, 107, 113
See application file for complete search history.

(56) References Cited

U.S. PATENT DOCUMENTS

| | | | | |
|---|---|---|---|---|
| 5,627,968 A * | 5/1997 | Ozaki et al. | ................ | 709/212 |
| 5,689,644 A * | 11/1997 | Chou et al. | ................ | 370/392 |
| 5,764,927 A * | 6/1998 | Murphy et al. | .............. | 710/105 |
| 5,815,674 A * | 9/1998 | LaBerge | ..................... | 710/107 |
| 5,982,672 A * | 11/1999 | Moon et al. | ............ | 365/189.02 |
| 6,119,196 A * | 9/2000 | Muller et al. | ............... | 710/243 |
| 6,513,082 B1 * | 1/2003 | Fischer et al. | ............... | 710/113 |
| 6,694,385 B1 * | 2/2004 | Fuoco et al. | ................... | 710/8 |
| 2002/0099855 A1 * | 7/2002 | Bass et al. | .................. | 709/249 |

* cited by examiner

*Primary Examiner*—Tariq Hafiz
*Assistant Examiner*—Jasjit S Vidwan
(74) *Attorney, Agent, or Firm*—Christopher P. Maiorana, PC

(57) ABSTRACT

A system comprising a plurality of controller circuits, a plurality of line buffer circuits and an arbiter. The plurality of control circuits may each be configured to store data. The plurality of line buffer circuits may each be configured to transfer data between an accessed one of the controller circuits and one of a plurality of first busses. The arbiter circuit may be configured to control access to the controller circuits by the line buffer circuits.

20 Claims, 14 Drawing Sheets

READ DATA SHOULD BE STABLE AT THIS CLOCK EDGE FOR CAPTURE

AMBA MODULAR MEMORY CONTROLLER

This is a divisional of U.S. Ser. No. 10/325,383 filed Dec. 20, 2002, now U.S. Pat. No. 7,114,041.

CROSS REFERENCE TO RELATED APPLICATIONS

The present application may relate to applications (i) Ser. No. 10/262,180 filed Oct. 1, 2002, now U.S. Pat. No. 6,799,304, (ii) Ser. No. 10/323,521, filed Dec. 18, 2002, now U.S. Pat. No. 7,062,577, and (iii) Ser. No. 11/328,480, filed Jan. 9, 2006, now U.S. Pat. No. 7,330,911, which are hereby incorporated by reference in their entirety.

FIELD OF THE INVENTION

The present invention relates to multiport devices generally and, more particularly, to a peripheral controller for a multiport bus architecture slave device.

BACKGROUND OF THE INVENTION

Multiport slave peripheral circuit designs are commonly a single monolithic block within an application specific integrated circuit (ASIC). The monolithic block approach creates difficulties in reusing all or portions of the design since the design is customized for the original ASIC application. Where portions of the design are reused, maintenance becomes difficult where the reused blocks are modified in order to be fully integrated with other blocks in the new application.

Another limitation of the monolithic block approach is encountered where bus traffic at a particular port varies among and/or within applications. For example, a multiport Advanced High-performance Bus (AHB) application may use a bus A to support very bursty but short traffic requests while a bus B may use 64-bit, long linear requests. A monolithic block optimized for bus A will not perform as well with bus B. What is desired is a reusable multiport slave peripheral architecture where a peripheral control function can be adapted to meet a wide number of bus interfaces types, arbitration schemes, and peripheral resources.

SUMMARY OF THE INVENTION

The present invention concerns a system comprising a plurality of controller circuits, a plurality of line buffer circuits and an arbiter. The plurality of control circuits may each be configured to store data. The plurality of line buffer circuits may each be configured to transfer data between an accessed one of the controller circuits and one of a plurality of first busses. The arbiter circuit may be configured to control access to the controller circuits by the line buffer circuits.

The objects, features and advantages of the present invention include providing a peripheral controller for a multiport slave device that may (i) allow for compile-time determination of an internal and/or external memory interface data width, (ii) support double data rate memory device, (iii) support four to thirty-two banks of memory circuits, (iv) address high density memory circuits, (v) monitor read/write performance, and/or (vi) accommodate different latency options that may allow use of both registered and non-registered SSTL2 output buffers for primary rate DDR signals.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
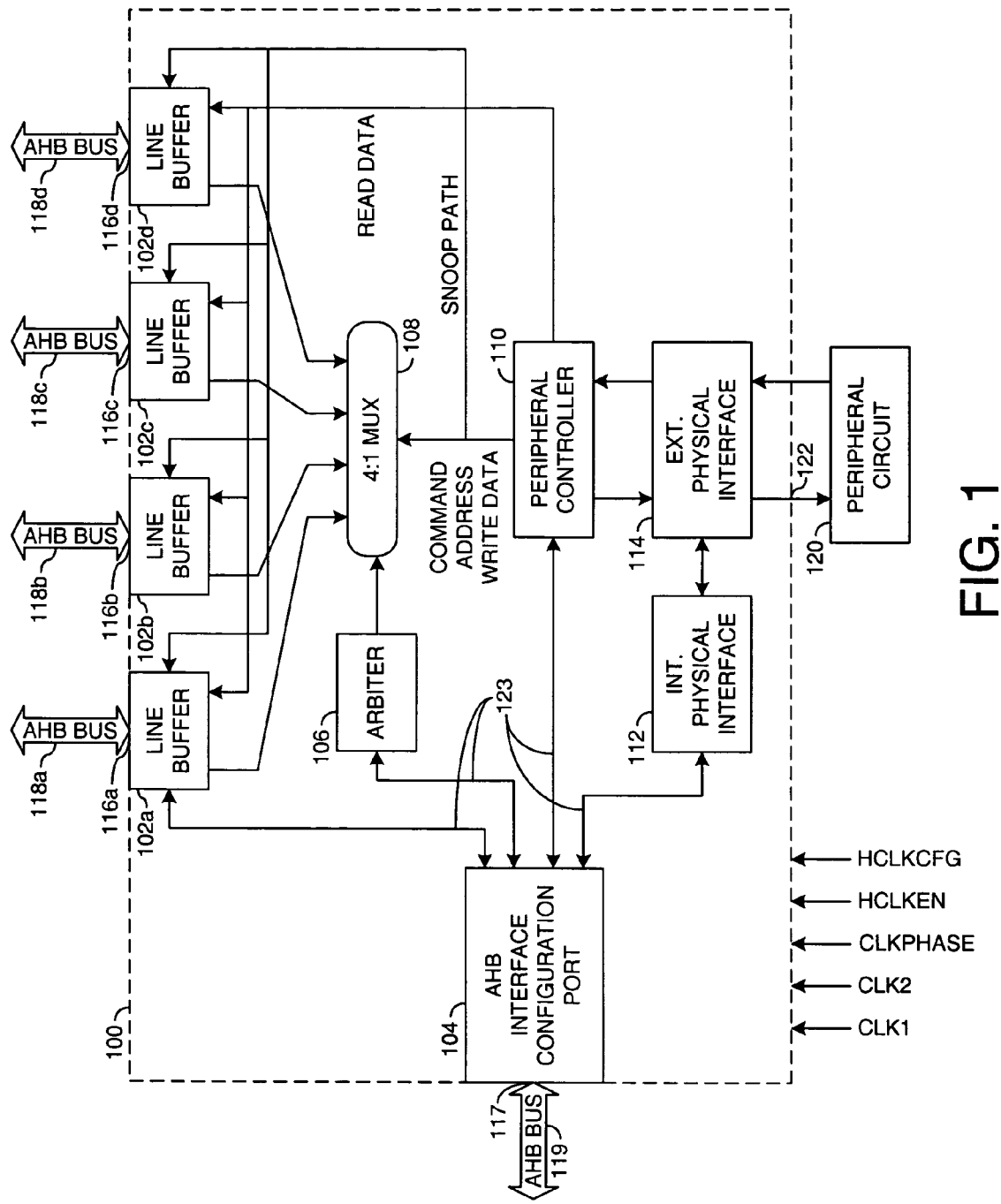
FIG. 1 is a block diagram of an example system in accordance with a preferred embodiment of the present invention.

Referring to FIG. 1, a block diagram of an example system 100 is shown in accordance with a preferred embodiment of the present invention. The system 100 generally comprises multiple line buffer circuits or blocks 102a-d, a configuration port circuit or block 104, an arbiter circuit or block 106, a multiplexer circuit or block 108, a peripheral controller circuit or block 110, an optional internal physical interface circuit or block 112, and an optional external physical interface circuit or block 114. Each line buffer circuit 102a-d may have an interface 116a-d configured to couple to a bus 118a-d external to the system 100. The configuration port circuit 104 may have an interface 117 configured to couple to a configuration bus 119 external to the system 100. The external physical interface block 114 may have an interface 122 connectable to a peripheral circuit or block 120 external to the system 100. Multiple register interface busses or internal busses 123 may link the configuration port circuit 104 to the line buffer circuits 102a-d, the arbiter circuit 106, the peripheral controller circuit 110, and/or the internal physical interface circuit 112.

The system 100 may provide interfaces between multiple AHB masters (not shown) and the peripheral controller circuit 110 for data transfers. The system 100 generally uses a line buffer architecture as opposed to a first-in-first-out (FIFO) based architecture. The line buffer circuits 102a-d may handle an AHB slave protocol then translate AHB requests into requests to the arbiter circuit 106 and the peripheral controller circuit 110. The transactions (e.g., reads and writes) to the peripheral controller circuit 110 may be handled as single line requests. Each line request may involve moving multiple words of data (e.g., 64 or 128 bits) in multiple beats or transfers (e.g., two or four). Because the requests may be handled on a line basis, line registers or buffers in the system 100 generally use a same line size (e.g., 128 bits or 256 bits). The line size may also be in relationship to a width of the external data path to the peripheral circuit 120 and a number of beats used to transfer the data. For example, the data path width (e.g., in bits) times the number of beats (e.g., four or eight) generally equals the width of the line buffers.

The arbiter circuit 106 generally chooses which request from which line buffer circuit 102*a*-*d* may be serviced by the peripheral controller circuit 110. The arbiter circuit 106 may also translate some of the line buffer requests into a proper protocol for the peripheral controller circuit 110. The multiplexer circuit 108 (part of the arbiter circuit 106) may route the request to the peripheral controller circuit 110, one at a time.

The peripheral controller circuit 110 generally translates commands into actual interface signal levels used to control the external peripheral circuit 120. The peripheral controller circuit 110 may be programed to provide specific interface signals/timing for each type of peripheral circuit 120. The peripheral controller circuit 110 may be programed via the configuration port circuit 104. The external physical interface circuit 114 generally contains special input/output cells for communicating with the peripheral circuit 120. The internal physical interface circuit 112 generally provides programming access to the external physical interface circuit 114 through the configuration port circuit 104. Programming may include, but is not limited to, delay value and bypass control signals.

In one embodiment, the peripheral controller circuit 110 and the external physical interface circuit 114 may be designed to interface to a double data rate (DDR) memory type of peripheral circuit 120. In other embodiments, the peripheral controller circuit 110 may be configured as a random access memory (RAM) controller, a read-only memory (ROM) controller, a mass memory drive controller, an input/output device controller, a communications link controller, or the like. The external physical interface circuit 114 may be omitted where the peripheral controller circuit 110 may interface directly to the peripheral circuit 120 or where the peripheral resource may be contained within the peripheral controller circuit 110.

Each bus 118*a*-*d* may be implemented as an Advanced High-Performance Bus (AHB) defined in an "Advanced Microcontroller Bus Architecture (AMBA) Specification", revision 2.0, 1999, published by ARM Limited, Cambridge, England and hereby incorporated by reference in its entirety. A number of the line buffer circuits 102*a*-*b* may be varied to match a number of the AHB busses 118*a*-*d*. The line buffer circuits 102*a*-*d* may also be configured to interface to other types of busses and various configurations of the AHB bus to meet the criteria of the particular application. The variations may include bus width, bus speed, endianness and/or allowed transfer types.

The configuration bus 119 may be configured as an AHB bus. In one embodiment, the configuration bus 119 may be configured as an Advanced Peripheral Bus (APB) as defined by the AMBA specification. Other busses may be used as the configuration bus 119 to meet a design criteria of a particular application.

The line buffer circuits 102*a*-*d* may provide configurable data width translations and a number of data beats between the AHB busses 118*a*-*d* and the peripheral controller circuit 110. Generally, each transfer of data between the line buffer circuits 102*a*-*d* and the peripheral controller circuit 110 (e.g., READ_DATA and WRITE_DATA) may be as wide or wider than transfers between the line buffer circuits 102*a*-*d* and the AHB busses 118*a*-*d*. Each transfer of data between the line buffer circuits 102*a*-*d* and the peripheral controller circuit 110 may be implemented as two or more (e.g., two or four) data beats.

The line buffer circuits 102*a*-*d* may provide endian translations between the AHB busses 118*a*-*d* and the peripheral controller circuit 110, as appropriate. For example, the peripheral controller circuit 110 and the AHB bus 118*a* may treat data as big endian while the AHB busses 118*b*-*d* may treat data as little endian. Other combinations of big and little endianness may be provided to meet a criteria of a particular application.

Address information (e.g., ADDRESS) may be transferred from the AHB busses 118*a*-*d* to the peripheral controller circuit 110 with or without modification depending upon configuration bits set within the line buffer circuits 102*a*-*d* through the configuration port circuit 104. Command information (e.g., COMMAND) may be generated by each line buffer circuit 102*a*-*d* for accessing the peripheral controller circuit 110. A set of signals (e.g., SNOOP_PATH) may be tapped from outputs of the multiplexer circuit 108 and provided to the line buffer circuits 102*a*-*d* to handle cases where a first line buffer circuit 102*a*-*d* may be preparing to read from an address that a second line buffer circuit 102*a*-*d* may be preparing to write.

Each line buffer circuit 102*a*-*d* may be configured as an AHB slave device that buffers requests to the peripheral controller circuit 110. Data may be written and/or read from the peripheral controller circuit 110 in multi-bit lines (e.g., 256-bits or 128-bits). Read data from the peripheral controller circuit 110 may be transmitted to each line buffer circuit 102*a*-*d* simultaneously. Information identifying which line buffer circuit 102*a*-*d* the data is intended for may also be transmitted by the peripheral controller circuit 110. The write data presented through the line buffer circuits 102*a*-*d* may be routed to the peripheral controller circuit 110 through the multiplexer circuit 108. Using only 256-bit or 128-bit requests to the peripheral controller circuit 110 may simplify control logic (e.g., FIG. 6) of the peripheral controller circuit 110 compared with designs accepting 256, 128, 64, 32 and 16-bit requests.

The peripheral controller circuit 110 generally receives several (e.g., three) clocks. A clock signal (e.g., CLK1), or sub-multiple thereof, may provide basic clocking for the peripheral controller circuit 110 and the line buffer circuits 102*a*-*d*. The clock signal CLK1 may have a frequency equal to a highest frequency an AHB clock (e.g., HCLK) operated with the system 100. The frequency of the clock signal CLK1 may also be a primary rate frequency of the external peripheral circuit 120. The clock signal CLK1 generally has a 50/50 duty cycle. The clock signal CLK1 may be used by the line buffer circuits 102*a*-*d* as the AMBA defined clock signal HCLK would be used. If the clock signal HCLK is a sub-multiple of the clock signal CLK1, an enable signal (e.g., HCLKEN) may be used to indicate active edges of the clock signal CLK1. In one embodiment, the clock signal CLK1 may have a maximum frequency of approximately 133 megahertz (MHZ) and a minimum frequency of approximately 50 MHZ. The minimum frequency may dependent on a minimum frequency of the peripheral circuit 120.

Another clock signal (e.g., CLK2) may be implemented as a double rate clock having rising edge coinciding with the edges of the clock signal CLK1. The clock signal CLK2 may have a duty cycle less rigorous than 50/50. An enable signal (e.g., CLKPHASE) may be a delayed version of the clock signal CLK1 and is generally used as an enable for the double rate clock signal CLK2 to discern the phases. The read data transfers from the peripheral controller circuit 110 may occur at a clock signal CLK1 rate. Write transfers to the peripheral controller circuit 110 may occur at a rate of the clock signal CLK2.

A third clock signal (e.g., HCLKCFG) may be used in place of the AMBA clock signal HCLK for the configuration port circuit 104. The configuration port circuit 104 generally does not use the enable signal HCLKEN associated with the port directly. The configuration port circuit 104 generally expects the clock signal HCLKCFG to have the proper frequency divisions when a sub-multiple frequency is used.

A reset scheme used in the system 100 may be completely synchronous. Individual line buffer circuits 102a-d may be reset by a reset signal (e.g., HRESETn) provided from the associated AHB bus 118a-d to the particular line buffer circuits 102a-d. A reset state is generally accomplished after a single cycle of the clock signal CLK1. The system 100 may be designed so that a reset on one of the line buffer circuits 102a-d may not affect other AHB transactions going on through the other line buffer circuits 102a-d nor affect ongoing read/write requests to the peripheral controller circuit 110.

The arbiter circuit 106, peripheral controller circuit 110 and internal busses 123 may be reset by the configuration bus 119 reset signal HRESETn. Any ongoing read/write requests to the peripheral controller circuit 110 may be disrupted and an entire state of the peripheral controller circuit 110 may need to be reconfigured. In addition, because a refresh operation may be disrupted as part of the reset operation, a memory type peripheral device 120 may need to be reinitialized. As with the reset of the line buffer circuits 102a-d, the configuration port reset signal HRESETCFGn should be asserted for at least a cycle of the clock signal CLK1.

Figure 2:
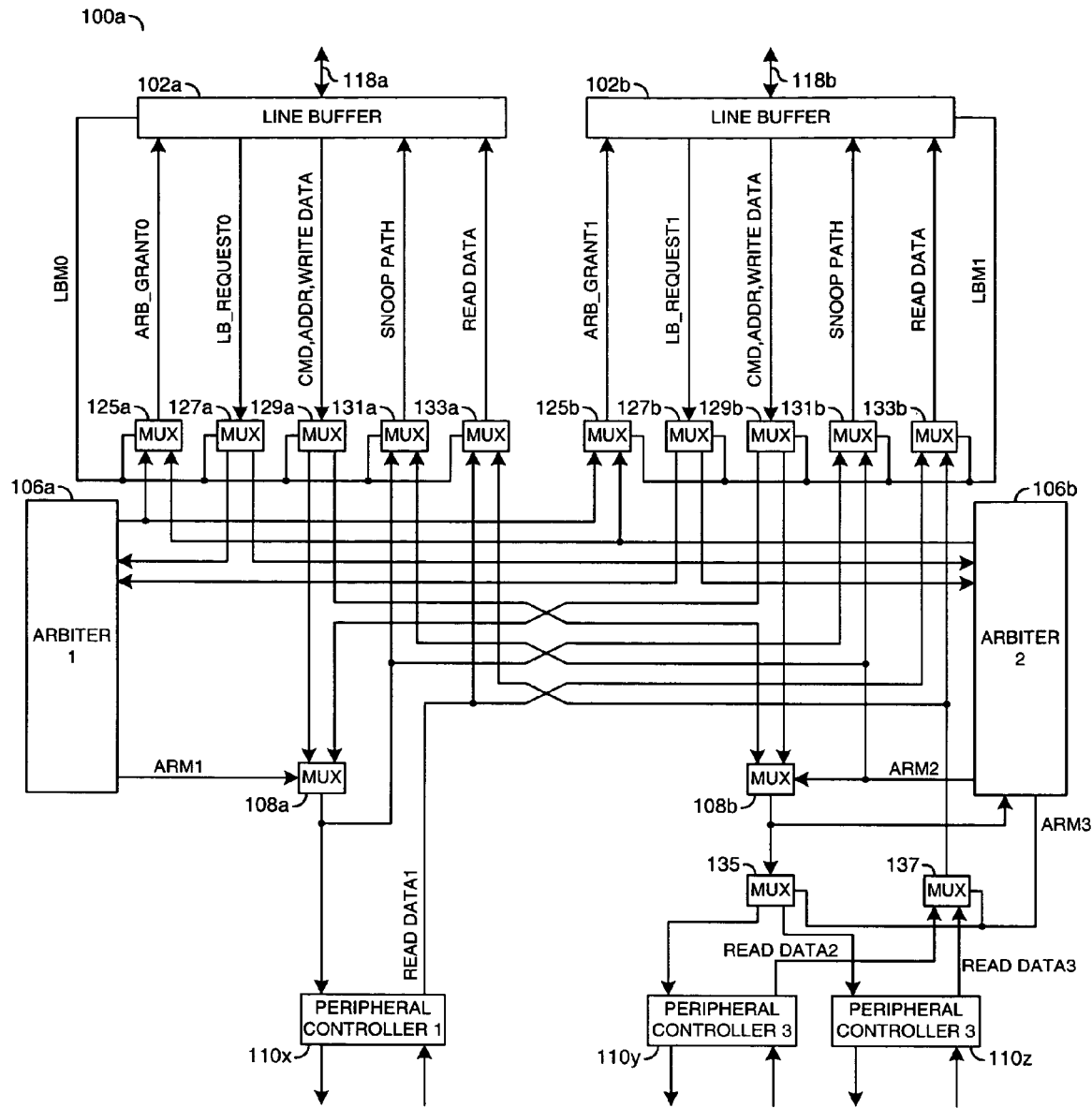
FIG. 2 is a block diagram of a portion of a second example system.

Referring to FIG. 2, a block diagram of a portion of a second example system 100a is shown. The system 100a may be implemented using multiple arbiter circuits 106a-b and/or multiple peripheral controller circuits 110x-z. Several multiplexers 125a-b, 127a-b, 129a-b, 131a-b and 133a-b may be included in the system 100a to allow the line buffer circuits 102a-b to control access selection among the arbiter circuits 106a-b and the peripheral controller circuits 110x-z. The multiplexers 125a-b, 127a-b, 129a-b, 131a-b and 133a-b may be implemented as part of the line buffer circuits 102a-b or as separate modules.

A signal (e.g., LBM0-LBM1) may be generated by each of the line buffer circuits 102a-b to control the multiplexers 125a-b, 127a-b, 129a-b, 131a-b and 133a-b, respectively. Each line buffer circuit 102a-b may use a requested address received from the AHB busses 118a-b to determine which arbiter circuit 106a-b controls access to a particular peripheral controller circuit 110x-z mapped to the requested address. Therefore, multiple line buffer circuits 102a-b may request arbitration and receive a grant from multiple arbiter circuits 106a-b substantially simultaneously. For example, the first line buffer circuit 102a may request access to the first peripheral controller circuit 110x from the first arbiter circuit 106a while the second line buffer circuit 102b may concurrently request access to the third peripheral controller circuit 110z from the second arbiter circuit 106b.

A multiplexer 108a may provide access to the first peripheral controller circuit 110x by the line buffer circuits 102a-b. A signal (e.g., ARM1) may be generated by the first arbiter circuit 106a to address the multiplexer 108a. A multiplexer 108b may provide access to the second and the third peripheral controller circuits 110y-z by the line buffer circuits 102a-b. A signal (e.g., ARM2) may be generated by the second arbiter circuit 106b to address the multiplexer 108b. Another multiplexer 135 may provide access selection between the second peripheral circuit 110y and the third peripheral circuit 110z. A signal (e.g., ARM3) may be generated by the second arbiter circuit 106b to address the multiplexer 135. The signal ARM3 may also address a multiplexer 137 that routes the read data from the second peripheral control circuit 110y or the third peripheral control circuit 110z back to the line buffer circuits 102a-b (via the multiplexers 133a-b). In one embodiment, the third peripheral controller circuit 110z, the multiplexer 135 and the multiplexer 137 may be eliminated such that the second arbiter circuit 106b arbitrates for access only to the second peripheral controller circuit 110y.

Figure 3:
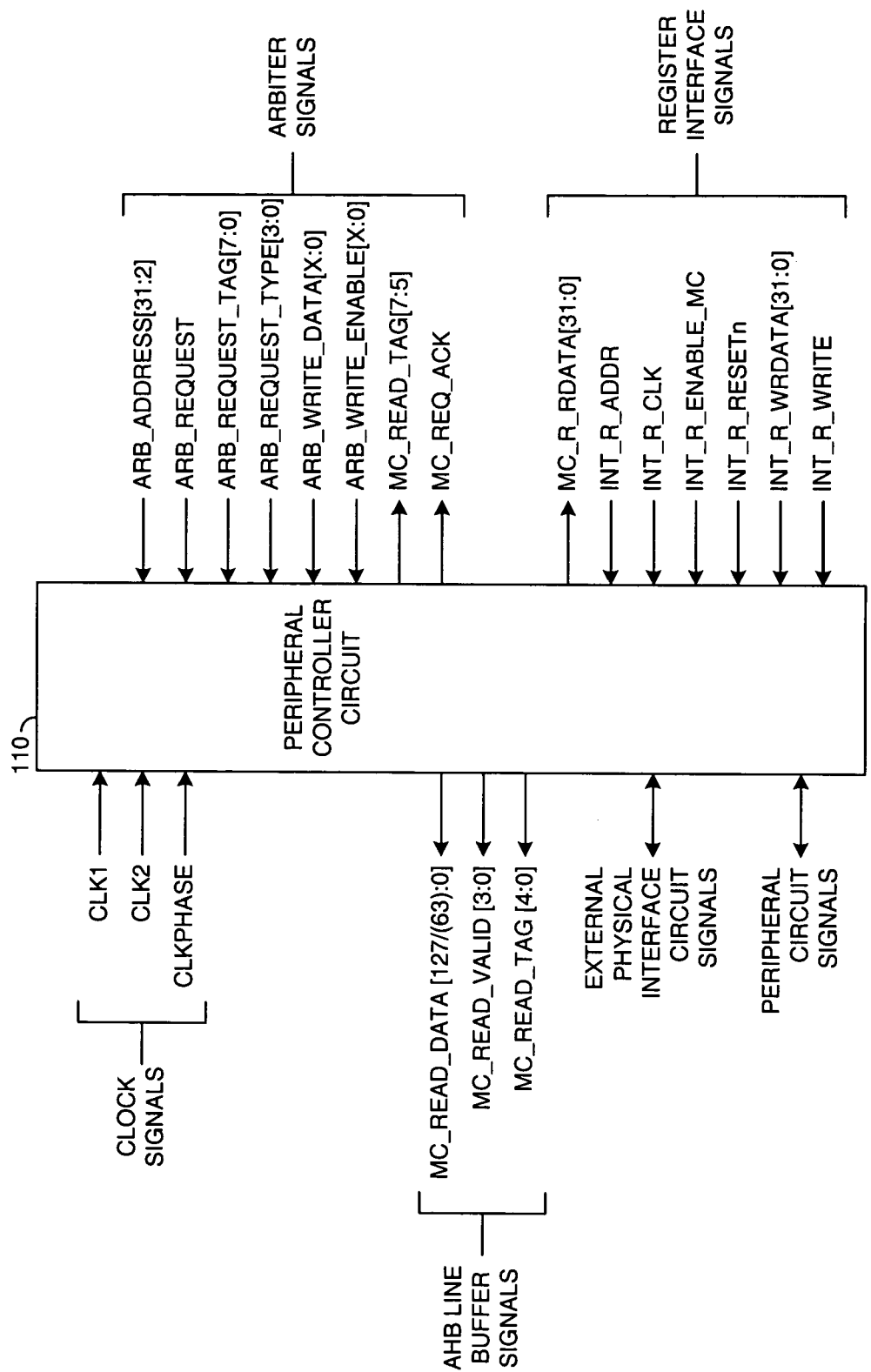
FIG. 3 is a block diagram of a peripheral controller circuit.

Referring to FIG. 3, a block diagram of a peripheral controller circuit 110 is shown. The input and output signals for the peripheral controller circuit 110 may be grouped together based upon signal sources and destinations. The groupings may include, but may not be limited to clock signals, line buffer signals, arbiter signals, and control register interface signals. External physical interface circuit signals and peripheral circuit signals may be included where appropriate to interface with the external physical interface circuit 114 and/or directly to the peripheral circuit 120.

Figure 4:
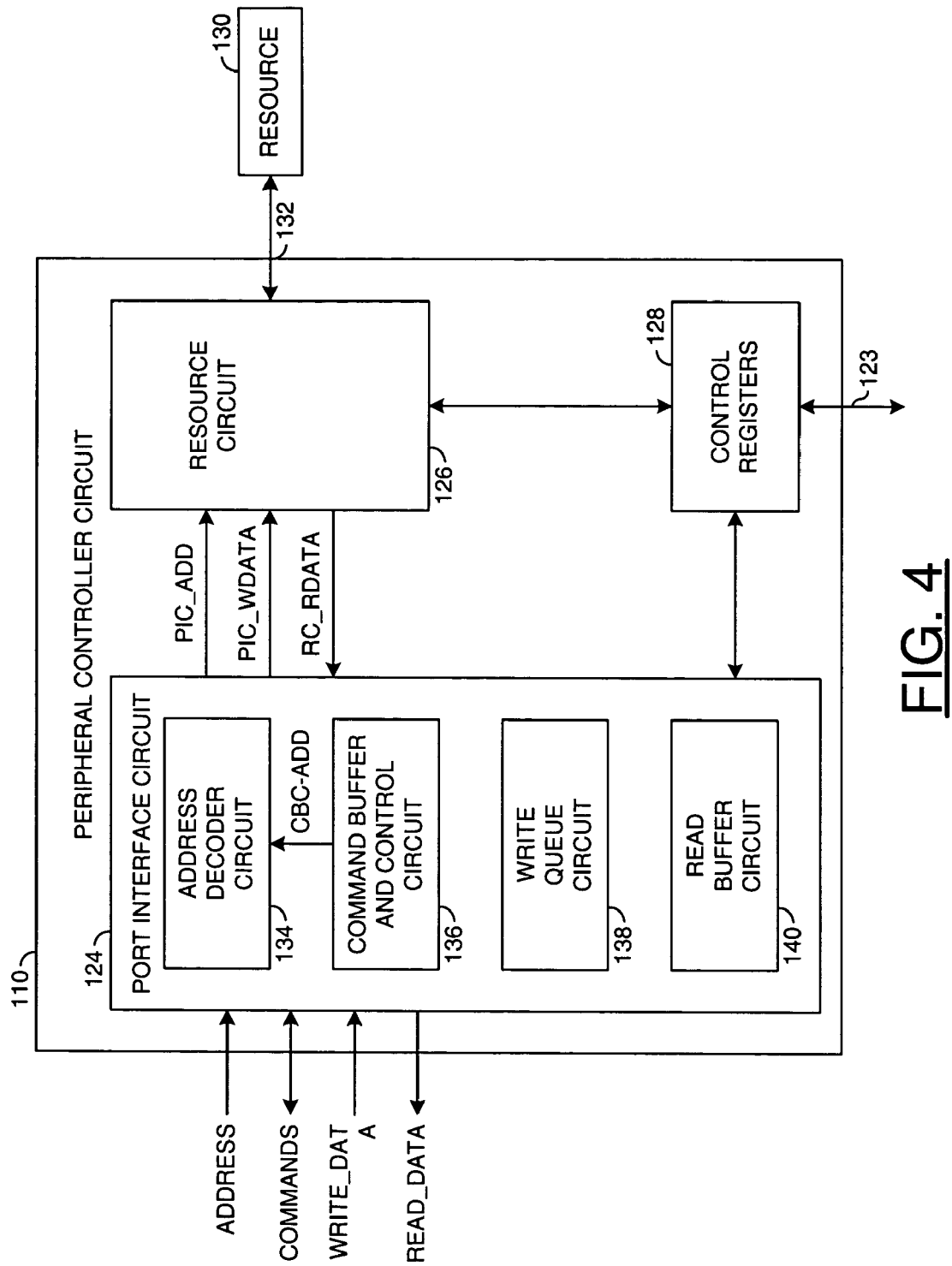
FIG. 4 is a detailed block diagram of the peripheral controller circuit.

Referring to FIG. 4, a detailed block diagram of the peripheral controller circuit 110 is shown. The peripheral controller circuit 110 generally comprises a circuit or block 124, a circuit or block 126 and one or more registers or blocks 128. The circuit 124 may be implemented as a port interface circuit. The port interface circuit 124 generally communicates with the AHB busses 118a-d through the line buffer circuit 102a-d and the multiplexer circuit 108. The port interface circuit 124 may establish a standard interface to the rest of the system 100 for most or all implementations of the peripheral controller circuit 110.

The circuit 126 may be implemented as a resource circuit. The resource circuit 126 may be implementation dependent. In some implementations, the resource circuit 126 may provide a storage resource requested through the AHB busses 118a-d. For example, the resource circuit 126 may provide memory, semaphore, and/or mailbox functionality. In other implementations, the resource circuit 126 may provide an interface to a resource 130 external to the peripheral controller circuit 110 through an interface 132. For example, the resource 130 may be a memory and/or communication capability. In one embodiment, the resource 130 may be a double data rate (DDR) memory capability incorporating the external interface circuit 114 and the peripheral circuit 120. The control registers 128 may provide a capability to program the port interface circuit 124 and/or the resource circuit 126 through the configuration port circuit 104.

The port interface circuit 124 generally comprises a circuit or block 134, a circuit or block 136, a circuit or block 138 and a circuit or block 140. The circuit 134 may be implemented as an address decoder. The address decoder may be configured to provide address translations between an address domain of the AHB busses 118a-d and another address domain of the resource circuit 126. The address decoder circuit 134 may receive the address signal ADDRESS and/or an address signal (e.g., CBC_ADD) and then generate another address signal (e.g., PIC_ADD).

The circuit 136 may be implemented as a command buffers and control circuit. The command buffer and control circuit 136 generally provides buffering of various command signals COMMAND from the arbiter circuit 106. The command buffer and control circuit 136 may also provide translations of the various command signals COMMAND being buffered into one or more command signals (e.g., PIC_CMD) understood by the resource circuit 126 and/or the resource 130. The command buffer and control circuit 136 may also generate the address signal CBC_ADD based upon a current command for use by the address decoder circuit 134.

The circuit 138 may be implemented as a write queue circuit. The write queue circuit 138 may be configured to queue or buffer data signals WRITE_DATA in a sequence as requested by the line buffer circuits 102a-d. Each data signal WRITE_DATA in the write queue circuit 138 may have one or more corresponding write commands in the command buffer and control circuit 134. The data signals WRITE_DATA may be transferred to the resource circuit 126 as a data signal (e.g., PIC_WDATA).

The circuit 140 may be implemented as a read buffer circuit. The read buffer 140 may store data signals (e.g., RC_RDATA) in a sequence as requested by the line buffer circuits 102a-d. Each read data signal RC_RDATA in the read buffer circuit 140 may have one or more associated read commands in the command buffer and control circuit 134. The read data signals RC_RDATA may be transferred to the line buffer circuits 102a-d as the data signal READ_DATA.

Figure 5:
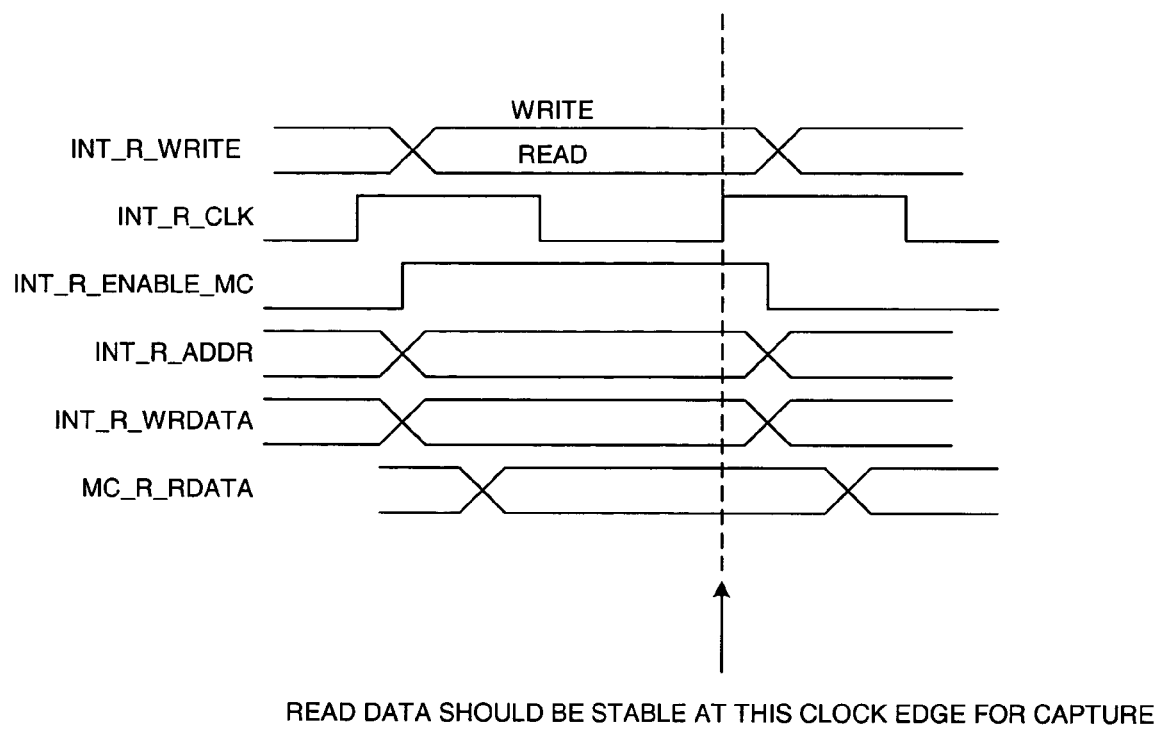
FIG. 5 is a timing diagram for writing and reading to and from control registers.

Referring to FIG. 5, a timing diagram for writing and reading to and from the control registers 128 is shown. During a read operation, an address signal (e.g., INT_R_ADDR), a control signal (e.g., INT_R_WRITE) and an enable signal (e.g., INT_R_ENABLE_MC) may be driven to the peripheral controller circuit 110. The peripheral controller circuit 110 may steer a data signal (e.g., MC_R_RDATA) back to the configuration port circuit 104. The data signal MC_R_RDATA may be registered by the clock HCLK within the configuration port circuit 104 and driven out onto the AHB Bus 119. During a write operation, the address signal INT_R_ADDR, the control signal INT_R_WRITE, the enable signal INT_R_ENABLE_MC and a data signal (e.g., INT_R_WRDATA) may be driven to the peripheral controller circuit 110 from the configuration port circuit 104 and clocked by the rising edge of INT_R_CLK. The signals shown in FIG. 5 may provide a simple interface that may be dedicated as a sideband control/status interface to the peripheral controller circuit 110. Similar interfaces to the other programmable elements, such as the line buffer circuit 102a-d, arbiter circuit 106 and/or the internal physical interface circuit 112 may also be implemented. In one embodiment, the signals shown in FIG. 5 may provide an alternate interface to the external peripheral circuit 120.

Figure 6:
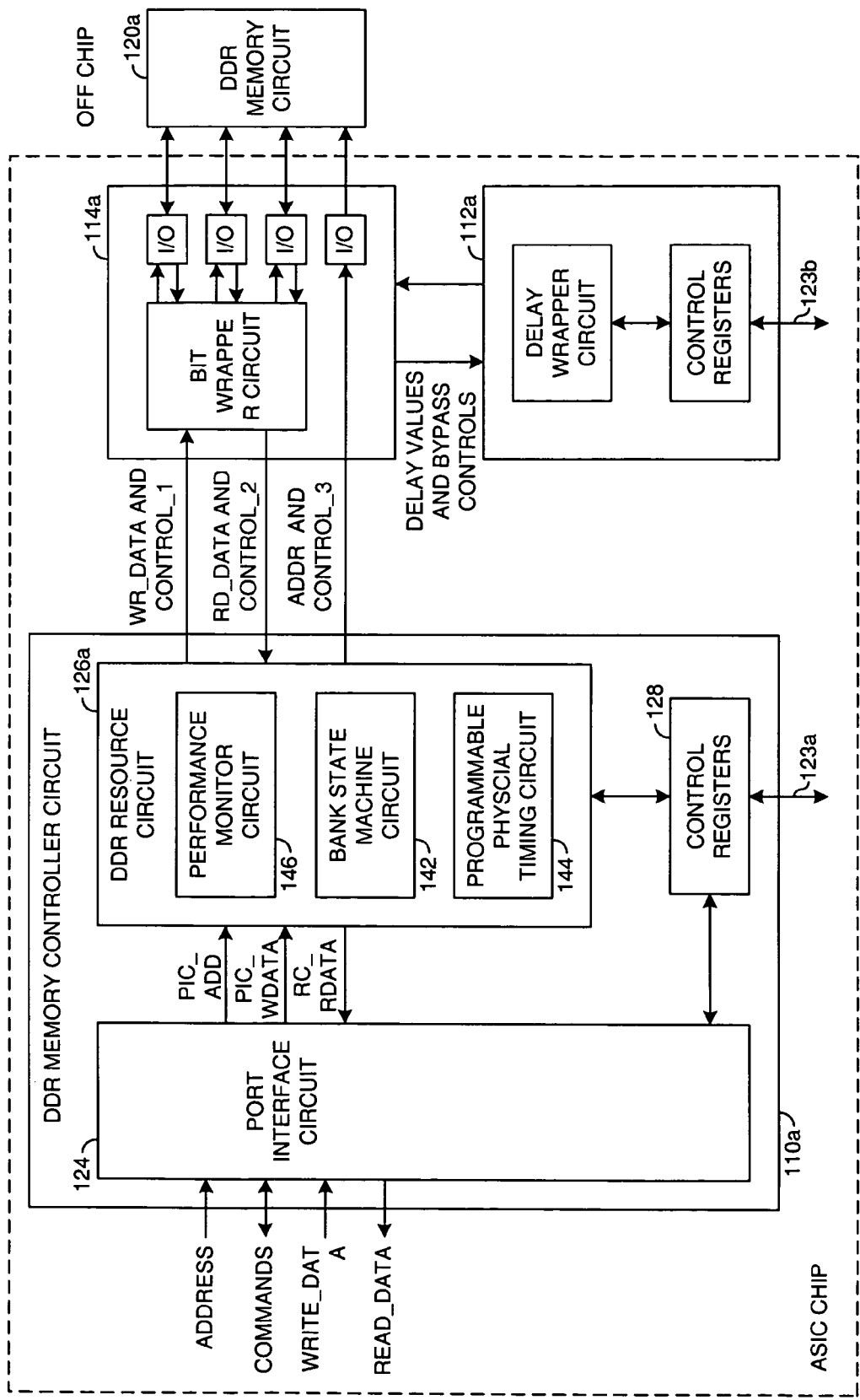
FIG. 6 is a block diagram of a first embodiment of the peripheral controller circuit.

Referring to FIG. 6, a block diagram of a first embodiment of the peripheral controller circuit 110 is shown. The peripheral controller circuit 110 may be implemented as the DDR memory controller circuit 110a. The external physical interface circuit 114 may be implemented as a DDR physical interface circuit 114a. The peripheral circuit 120 may be implemented as one or more DDR memory circuits or banks 120a. The port interface circuit 124 within the DDR memory controller circuit 120a may be configured as described above. The resource circuit 126 may be configured as a DDR resource circuit 126a to provide control and timing for the DDR memory circuits 120a.

The DDR memory controller circuit 110a generally enables the use of multiple on-chip AHB buses 118a-d which may allow concurrency of AHB transactions while at the same time providing for a common or centralized memory area between the AHB subsystems. Each of the AHB busses 118a-d may have a separate multiple-bit (e.g., 32-bit) addressable memory region. The physical DDR memory circuit 120a may be mapped anywhere within the independent addressable regions. The multiport configuration may have an advantage over a multilayer bus implementation in that the DDR memory controller circuit 110a itself may prioritize requests (possibly under user control) and overlap operations to the external DDR memory circuit 120a in order to optimize both bandwidth and latency. The optimizations generally include such capabilities as read and write buffering, coherency detection, improved arbitration, and look ahead on DDR access requests while considering current DDR memory bank state. A read and write buffering within the line buffer circuits 102a-d may help reduce the access latency to the DDR memory circuit 120a and may also increase a utilization of the available bandwidth at the interface 122. The modular design of the system 100 may allow the architecture to be optimized for an expected AHB bus traffic profile.

The DDR resource circuit 126a generally comprises a circuit or block 142, a circuit or block 144 and an optional circuit or block 146. The circuit 142 may be configured as a state machine. The state machine 142 may provide signal sequencing for controlling the DDR memory circuits 120a. The circuit 144 may be implemented as a programmable physical timing circuit. The programmable physical timing circuit 144 may regulate timing of commands and data to and from the DDR memory circuits 120a based upon the sequences generated by the state machine circuit 142. The circuit 146 may be implemented as a performance monitor circuit. The performance monitor circuit 146 generally monitors multiple factors within the DDR memory controller that may aid in adjusting the programmable settings to maximize performance.

Configuration of the DDR memory controller circuit 110a may support a wide variety of compile-time options, strappable options, and/or programming of the control registers 128. Additional configuration may be generated to meet a design criteria of a particular application. The programmable options may affect such things as line buffer circuit operation, arbitration priority scheme, DDR device support and modes, and a number of beats (e.g., 8) per DDR memory burst. Other options may be implemented to meet the criteria of a particular implementation. Table I lists compile-time options that may be supported by the DDR memory controller circuit 120a:

TABLE I

| Compile-Time Options | Option Description |
| --- | --- |
| DDR bank support | Supports 4-32 banks. Bank state machines may be in groups of 4 (e.g., 4, 8, 12, etc.). DDR bank support effectively selects a number of DDR SDRAM stacks that may be supported (e.g., depth of memory). |
| Number of AHB ports | 2-8 ports. |
| DDR external data path width/line buffer size | External DDR width of 16, 32, 64 or 72 bits. Line buffer size of 128 or 256 bits. External DDR width, number of DDR burst beats, and line buffer size are generally closely related. |

TABLE I-continued

| Compile-Time Options | Option Description |
|---|---|
| | Line buffer size may be optimized to match a DDR burst block size. |
| Compile option for inclusion of performance monitor registers in the DDR memory controller circuit. | Included or not included. |

Each strappable option may be set using a strap pin or bonding pad (not shown). The strap pin may be connected to power or ground to determine the option. The strappable options may be described in Table II as follows:

TABLE II

| Strap Option Name | Option Description |
|---|---|
| Endianness | Big or little endian (per port). |
| AHB port width | 32 or 64-bit (per port) |
| DDR primary rate signal latency | Controls primary rate DDR signal bypass multiplexer. Allows use of either registered or non-registered SSTL2 input/output buffers. |

Programmer visible objects within a multiport DDR memory type system 100 may be summarized below. High level guidelines for complex peripheral (e.g., memory) controller circuits 110 may use an address space as follows:

```
// Configuration Register Block Base Addr[15:0]
// Arbiter:          0000h --> 7FFFh
// DDR Controller:   8000h --> 9FFFh
// DDR Physical:     A000h --> BFFFh
//
// Line Buffer 0:    C000h --> C3FFh
// Line Buffer 1:    C400h --> C7FFh
// Line Buffer 2:    C800h --> CBFFh
// Line Buffer 3:    CC00h --> CFFFh
//
// Line Buffer 4:    D000h --> D3FFh
// Line Buffer 5:    D400h --> D7FFh
// Line Buffer 6:    D800h --> DBFFh
// Line Buffer 7:    DC00h --> DFFFh
//
// Line Buffer 8:    E000h --> E3FFh
// Line Buffer 9:    E400h --> E7FFh
// Line Buffer 10:   E800h --> EBFFh
// Line Buffer 11:   EC00h --> EFFFh
//
// Line Buffer 12:   F000h --> F3FFh
// Line Buffer 13:   F400h --> F7FFh
// Line Buffer 14:   F800h --> FBFFh
// Line Buffer 15:   FC00h --> FFFFh
//
```

The control registers 128 of a DDR memory controller circuit 110a and the external physical interface circuit 114 may be given in Table III and Table IV, respectively, as follows:

TABLE III

| Address (hex) | Register Name |
|---|---|
| Periph_Base + 8000 | Reserved for future reset |
| Periph_Base + 8004 to 8010 | Reserved for interrupts |
| Periph_Base + 8014 | Mode register |
| Periph_Base + 8018 | Extended mode register |
| Periph_Base + 801C | Memory configuration |
| Periph_Base + 8020 | Backdoor control 1 |
| Periph_Base + 8024 | Backdoor control 2 |
| Periph_Base + 8028 | Backdoor read data 1 |
| Periph_Base + 802C | Backdoor read data 2 |
| Periph_Base + 8030 | Backdoor read data 3 |
| Periph_Base + 8034 | Backdoor write data 1 |
| Periph_Base + 8038 | Backdoor write data 2 |
| Periph_Base + 803C | Backdoor write data 3 |
| Periph_Base + 8040 | Backdoor control 3 |
| Periph_Base + 8044 to 804C | Reserved |
| Periph_Base + 8050 | Bank configuration 1 |
| Periph_Base + 8054 | Bank configuration 2 |
| Periph_Base + 8058 | Reserved |
| Periph_Base + 805C | Reserved |
| Periph_Base + 8060 | Performance monitor control |
| Periph_Base + 8064 | Performance monitor preload |
| Periph_Base + 8068 to 8070 | Reserved |
| Periph_Base + 8074 | Time Active to Precharge min. |
| Periph_Base + 8078 | Time Active to Precharge max. |
| Periph_Base + 807C | Time Active to Active/Auto Refresh |
| Periph_Base + 8080 | Time Active to Read/Write Delay |
| Periph_Base + 8084 | Time Average Refresh Interval |
| Periph_Base + 8088 | Time Refresh Command Period |
| Periph_Base + 808C | Time Precharge Command Period |
| Periph_Base + 8090 | Time Active Bank A to Active Bank B Period |
| Periph_Base + 8094 | Time Write Recovery to Precharge Same Bank |
| Periph_Base + 8098 | Time Write to Read Delay |
| Periph_Base + 809C | Time Exit Self Refresh to non-Read Command |
| Periph_Base + 80A0 | Time Exit Self Refresh to Read Command |
| Periph_Base + 80A4 | Time Auto Precharge Write Recovery plus Precharge |
| Periph_Base + 80A8 | Back-to-back read/write |
| Periph_Base + 80AC | Back-to-back reads |
| Periph_Base + 80B0 | Back-to-back write/read |
| Periph_Base + 80B4 | Back-to-back writes |
| Periph_Base + 80B8 | Reserved |
| Periph_Base + 80BC | Time Active to Read Autoprecharge |
| Periph_Base + 80C0 | Write Recovery Autoprecharge |
| Periph_Base + 80C4 to 80DC | Reserved |
| Periph_Base + 80E0 | Miscellaneous command timing register |
| Periph_Base + 80E4 | Reserved |
| Periph_Base + 80E8 | Miscellaneous command latency |
| Periph_Base + 80EC | End of command timing register |
| Periph_Base + 80F0 to 810C | Reserved |
| Periph_Base + 8110 | Read timing register |
| Periph_Base + 8114 | Read timing loop register |
| Periph_Base + 8118 | Read latency |
| Periph_Base + 811C | Reserved |
| Periph_Base + 8120 | Read gate timing register |
| Periph_Base + 8124 | Read gate timing loop register |
| Periph_Base + 8128 | Read gate latency |
| Periph_Base + 812C | Reserved |
| Periph_Base + 8130 | Load even bank timing register |
| Periph_Base + 8134 | Load even bank timing loop register |
| Periph_Base + 8138 | Load even bank latency |
| Periph_Base + 813C | Reserved |
| Periph_Base + 8140 | Load odd bank timing register |
| Periph_Base + 8144 | Load odd bank timing loop register |
| Periph_Base + 8148 | Load odd bank latency |
| Periph_Base + 814C | Reserved |

TABLE III-continued

| Address (hex) | Register Name |
|---|---|
| Periph_Base + 8150 | Read allow timing register |
| Periph_Base + 8154 | Read allow timing loop register |
| Periph_Base + 8158 | End of read timing register |
| Periph_Base + 815C | End of read timing loop register |
| Periph_Base + 8160 to 817C | Reserved |
| Periph_Base + 8180 | Data bus data mask timing register |
| Periph_Base + 8184 | Data bus data mask timing loop register |
| Periph_Base + 8188 | Data bus data mask latency |
| Periph_Base + 818C | Reserved |
| Periph_Base + 8190 | Data bus output enable timing register |
| Periph_Base + 8194 | Data bus output enable timing loop register |
| Periph_Base + 8198 | Data bus output enable latency |
| Periph_Base + 819C | Reserved |
| Periph_Base + 81A0 | Data strobe timing register |
| Periph_Base + 81A4 | Data strobe timing loop register |
| Periph_Base + 81A8 | Data strobe latency |
| Periph_Base + 81AC | Reserved |
| Periph_Base + 81B0 | Data strobe output enable timing loop register |
| Periph_Base + 81B4 | Data strobe output enable timing loop register |
| Periph_Base + 81B8 | Data strobe output enable latency |
| Periph_Base + 81BC | Reserved |
| Periph_Base + 81C0 | Write allow timing register |
| Periph_Base + 81C4 | Write allow timing loop register |
| Periph_Base + 81C8 | End of write timing register |
| Periph_Base + 81CC | End of write timing loop register |
| Periph_Base + 81D0 to 81EC | Reserved |
| Periph_Base + 81F0 | Inactive register |
| Periph_Base + 81F4 to 81FC | Reserved |
| Periph_Base + 8200 | Interval timer LSB |
| Periph_Base + 8204 | Interval timer MSB |
| Periph_Base + 8208 | Request counter LSB |
| Periph_Base + 820C | Request counter MSB |
| Periph_Base + 8210 | Read bursts counter LSB |
| Periph_Base + 8214 | Read bursts counter MSB |
| Periph_Base + 8218 | Write bursts counter LSB |
| Periph_Base + 821C | Write bursts counter MSB |
| Periph_Base + 8220 | Bank miss counter LSB |
| Periph_Base + 8224 | Bank miss counter MSB |
| Periph_Base + 8228 | Refresh counter LSB |
| Periph_Base + 822C | Refresh counter MSB |
| Periph_Base + 8230 | Priority 3 request control LSB |
| Periph_Base + 8234 | Priority 3 request control MSB |
| Periph_Base + 8238 | Priority 2 request control LSB |
| Periph_Base + 823C | Priority 2 request control MSB |
| Periph_Base + 8240 | Priority 1 request control LSB |
| Periph_Base + 8244 | Priority 1 request control MSB |
| Periph_Base + 8248 | Priority 0 request control LSB |
| Periph_Base + 824C | Priority 0 request control MSB |
| Periph_Base + 8250 to 83FC | Reserved |
| Periph_Base + 8300 to 83FC | Reserved for bank state machine vectors (for tests) |
| Periph_Base + 8400 to 8FFF | Reserved |

TABLE IV

| Address (hex) | Register Name | Reset State |
|---|---|---|
| Periph_Base + A000 | Physical bypass control | 0x0000_0000 |
| Periph_Base + A004 | Physical master delay data | 0x0000_0000 |
| Periph_Base + A008 | Physical slave delay data | 0x0000_0000 |
| Periph_Base + A00C | Physical observable slave delay | 0x0000_0000 |
| Periph_Base + A010 | Physical observable master delay and lock | 0x0000_0000 |
| Periph_Base + A014 | Physical slave update strobe | 0x0000_0000 |
| Periph_Base + A018 to BFFF | Reserved | |

Both the DDR memory controller circuit 110a and the external DDR memory circuit 120a (e.g., SDRAM devices) generally use specific initialization sequences to be performed before the peripheral resource may be used. There may be several (e.g., five) separate initialization sequences which should be performed as follows:

1) DDR memory controller circuit initialization (e.g., timing registers, modes, etc.).
2) Arbiter circuit initialization (e.g., Slot assignment, priorities, etc.).
3) Line buffer circuit initialization (e.g., modes).
4) DDR external physical interface circuit initialization.
5) External DDR memory circuit configuration.

The interface signals for the DDR memory controller circuit 110a may be grouped by function as listed below. Clock Signals:

Primary Rate Clock (e.g., CLK1)—In

The clock signal CLK1 may be the primary rate DDR clock for the DDR memory controller circuit. The clock signal CLK1 may also be used by a DDR physical core-ware and within the DDR memory controller circuit in both the data path and control section of the controller. The rising edge of clock signal CLK1 should be coincident with the rising edge of clock signal CLK2.

Double Rate Clock (e.g., CLK2)—In

The clock signal CLK2 may be the double data rate clock for the DDR memory controller circuit. The clock signal CLK2 may also be used by the DDR physical core-ware and within the DDR memory controller circuit in both the data path and control section of the controller. The rising edge of clock signal CLK2 should be coincident with the rising edge of clock signal CLK1.

Phase Selector (e.g., CLKPHASE)—In

The signal CLKPHASE may be a delayed version of clock signal CLK1, used as an enable for registers clocked by the clock signal CLK2 to differentiate the two edges of the clock signal CLK2.

AHB Data Port Signals (e.g., Address/Data/Control). The AHB busses 118a-d generally act as high-performance system backbone busses. Each AHB bus 118a-d may support an efficient connection of processors, on-chip memories and off-chip external memory interfaces with low-power peripheral macrocell functions. The AHB data port signals:

AHB Bus Clock (e.g., HCLK)—In

The main clock signal for all AHB bus transfers. All signal timing may be related to a rising edge of the clock signal HCLK.

AHB Bus Clock Enable (e.g., HCLKEN)—In

The enable may be used to synchronize the clock signal CLK1 to the AHB's clock HCLK domain. If the clock signal CLK1 is a higher rate than the clock signal HCLK, the signal HCLKEN may be used to sync the two domains.

AHB Reset (e.g., HRESETn)—In

The bus reset signal may be active LOW and may be used to reset the system and the bus. The signal HRESETn may be the only active LOW signal.

AHB Address Bus (e.g., HADDR[31:0])—In

A 32-bit system address bus.

AHB Transfer Type (e.g., HTRANS[1:0])—In

Indicates the type of the current transfer generally comprising Sequential, Non-Sequential, Idle and Busy.

AHB Transfer Direction (e.g., HWRITE)—In

When HIGH the signal HWRITE may indicate a write transfer and when LOW a read transfer.

AHB Transfer Size (e.g., HSIZE[2:0])—In

Indicates the size of the transfer which is typically a byte (8-bit), halfword (16-bit) or word (32-bit). The protocol generally allows for larger transfer sizes up to a maximum of 1024 bits.

AHB Burst Type (e.g., HBURST[2:0])—In

Indicates if the transfer forms part of a burst. Four, eight and sixteen beat bursts may be supported and the burst may be either incrementing or wrapping.

AHB Protection Control (e.g., HPROT[3:0])—In

The protection control signals generally provide additional information about a bus access and may be primarily intended for use by any module that implements some level of protection. The signal HPROT[3:0] may indicate if the transfer is an opcode fetch or data access, as well as if the transfer may be a supervisor mode access or user mode access. For bus masters with a memory management unit the signal HPROT[3:0] may also indicate whether the current access is cacheable or bufferable.

AHB Write Data Bus (e.g., HWDATA[63/(31):0])—In

A write data bus that may be used to transfer data from the master to the bus slaves during write operations. The data bus width may be controlled by a signal HPORTSIZE[x].

AHB Slave Select (e.g., HSELx)—In

Each AHB slave may have an independent slave select signal and the signal may indicate that the current transfer is intended for the selected slave. The signal HSELx may be a combinational decode of the address bus.

AHB Read Data Bus (e.g., HRDATA[63/(31):0])—Out

A read data bus that may be used to transfer data from bus slaves to the bus master during read operations. The data bus width may be controlled by the signal HPORTSIZE[x].

AHB Transfer Done (e.g., HREADY)—In

When HIGH the signal HREADY may indicate that a transfer has finished on the bus. The signal may be driven LOW to extend a transfer. Slaves on the bus may use the signal HREADY as both an input and an output signal.

AHB Transfer Done (e.g., HREADYOUT)—Out

When HIGH the signal HREADY may indicate that a transfer has finished on the bus. The signal may be driven LOW to extend a transfer. Slaves on the bus may use the signal HREADY as both an input and an output signal.

AHB Transfer Responses (e.g., HRESP[1:0])—Out

The transfer response generally provides additional information on the status of a transfer. The responses generally comprise OKAY, ERROR, RETRY and SPLIT.

AHB Request Locked Transfers (e.g., HMASTLOCK)—In

When HIGH the signal may indicate that the master requests locked access to the bus and no other master should be granted the bus until the signal is LOW.

AHB Port Size (e.g., HPORTSIZE)—In

The signal generally controls the data path width for the AHB port for the appropriate data port (e.g., 0=32 bit data path and 1=64 bit data path).

AHB Port Endianness (e.g., BIGENDIAN)—In

The signal may control the data path endianness for the AHB port for the appropriate data port (e.g., 0=little endian and 1=big endian).

The configuration port circuit 104 may use the following signals:

Bus Clock (e.g., HCLKCFG)—In

The clock times all configuration bus transfers. All signal timings may be related to rising edge of signal HCLKCFG Reset (e.g., HRESETnCFG)—In The configuration bus reset signal may be active LOW and may be used to reset the system and the configuration bus.

Address Bus (e.g., HADDRCFG[31:0])—In

A 32-bit system address bus.

Transfer Type (e.g., HTRANSCFG[1:0])—In

Indicates the type of the current transfer generally comprising Sequential, Non-Sequential, Idle and Busy.

Transfer Direction (e.g., HWRITECFG)—In

When HIGH the signal may indicate a write transfer and when LOW a read transfer.

Transfer Size (e.g., HSIZECFG[2:0])—In

Indicates the size of the transfer which is typically byte (8-bit), halfword (16-bit) or word (32-bit). The configuration port circuit may respond with an error for any signal HSIZECFG not equal to 32 bits.

Write Data Bus (e.g., HWDATACFG[31:0])—In

A write data bus that may be used to transfer data from the master to the bus slaves during write operations.

Slave Select (e.g., HSELCFG)—In

Each configuration bus slave may have an independent slave select signal and the signal may indicate that the current transfer is intended for the selected slave. The signal may be a combinational decode of the address bus.

Read Data Bus (e.g., HRDATACFG[31:0])—Out

A read data bus that may be used to transfer data from bus slaves to the bus master during read operations.

Transfer Done (e.g., HREADYCFG)—In

When HIGH the signal HREADYCFG may indicate that a transfer has finished on the configuration bus. The signal may be driven LOW to extend a transfer. Slaves on the configuration bus may use the signal HREADYCFG as both an input and an output signal.

Transfer Done (e.g., HREADYOUTCFG)—Out

When HIGH the signal HREADYOUTCFG may indicate that a transfer has finished on the configuration bus. The signal may be driven LOW to extend a transfer. Slaves on the configuration bus may use the signal HREADYOUTCFG as both an input and an output signal.

Transfer Responses (e.g., HRESPCFG[1:0])—Out

The transfer response generally provides additional information on the status of a transfer. The responses generally comprise OKAY, ERROR, RETRY and SPLIT. The configuration port circuit may only respond with an OKAY or ERROR.

The peripheral controller circuit 110 may use the following signals:

MemoryControllerReadData (e.g., MC_READ_DATA [127|63|31:0])—Out

Multiplexed read data from the peripheral controller circuit to the line buffer circuit. Depending on the line buffer circuit configuration identified, MC_READ_DATA may be 128, 64 or 32 bits.

Memory Controller Read Valid (e.g., MC_READ_VALID [3:0])—Out

Active high signal that may indicate the data on the read data inputs may be valid. Bit 0 may indicate a least significant quarter of the read line may be present, while bit 3 may indicate a most significant quarter may be present. For a 2-beat internal (4-beat external) transfer, two of the valid bits may be set per read from the peripheral controller circuit to locate the data. For a 4-beat internal (8-beat external) transfer, a valid bit may be set per read from the peripheral controller circuit to locate the data.

Memory Controller Read Tag (e.g., MC_READ_TAG[4:0])—Out

A five bit request tag returned by the peripheral controller circuit that may recognize a particular read request made by the line buffer circuit. In many cases, MC_READ_TAG may be simply reroute back a signal (e.g., LB_REQUEST_TAG) sent during the request by the line buffer circuit. Bit 4 may be the even/odd line flag that identifies a particular line buffer circuit for which the data may be targeted for.

Request Address (e.g., ARB_ADDRESS[31:2])—In

An address of the arbiter circuit request to the peripheral controller circuit. Driven on the rising edge of clock CLK1.

Transaction Request (e.g., ARB_REQUEST)—In

An active high signal to the peripheral controller circuit that a memory request may happen. The signal may be asserted on the rising edge of CLK1 and held asserted for a clock cycle. Driven on the rising edge of CLK1.

Request Tag (e.g., ARB_REQUEST_TAG[7:0])—In

An eight bit quantity generally used to recognize a particular request. The arbiter circuit may append a three bit AHB bus interface circuit address to a line buffer request value and send to the peripheral controller circuit. The peripheral controller circuit merely passes on the value until the read results may be returned to the line buffer circuits. Driven on the rising edge of CLK1.

Request Type (e.g., ARB_REQUEST_TYPE[3:0])—In

May indicate a read or write request. For some arbiter circuit/peripheral controller circuit combinations (e.g., a DDR memory controller) more requests types may be defined (e.g., precharge, activate, refresh, etc.). The line buffer circuit may support several read and write types (e.g., 0=No-op, 1=Refresh, 2=Precharge, 3=Active, 4=Write, 5=Read, and 6-F=No-op). Driven on the rising edge of CLK1.

Write Data (e.g., ARB_WRITE_DATA[X:0])—In

Multiplexed write data from the line buffer circuits to the peripheral controller circuit via the arbiter data path multiplexer circuit 108. The bus width may be 32, 64, 128, or 144 bits and may be set as a compile time option. Driven on the rising edge of CLK2.

Byte Write Enable (e.g., ARB_WRITE_ENABLE[X:0])—In

An active high write enable for each byte of write data. The width of the byte write enable may depend on the data width from the line buffer circuits and may be set as a compile time option. The peripheral controller circuit may use the enable bits to extract the valid write data from the transfers. Driven on the rising edge of CLK2.

Register Bus Read Data (e.g., MC_R_RDATA[X:0])—Out

The peripheral controller circuit may place the register data corresponding to INT_R_ADDR on a register bus. The read data bus may be up to 32-bits wide. The signal may be derived from combinational logic and may be valid on the rising edge of INT_R_CLK.

Register Bus Address (e.g., INT_R_ADDR[10:2])—In

An address bus that may be nine bits to allow decoding of the control registers in the peripheral controller circuit. Bits 0 and 1 may not be included because the AHB may use word addressing. Driven on the rising edge of INT_R_CLK.

Register Bus Clock (e.g, INT_R_CLK)—In

A rising edge of INT_R_CLK may be used to time transfers on the register bus.

Register Bus Enable (e.g., INT_R_ENABLE_ARB)—In

Generally indicates that the transfer on the register bus may be intended for the peripheral controller circuit. Driven on the rising edge of INT_R_CLK.

Register Bus Reset (e.g., INT_R_RESETn)—In

May be active LOW and may be synchronous with respect to INT_R_CLK.

Register Bus Write Data (e.g., INT_R_WRDATA[31:0])—In

May contain write data for write transfers. The write data bus may be up to 32-bits wide. Driven on the rising edge of INT_R_CLK.

Register Bus Write (e.g., INT_R_WRITE)—In

A logical HIGH may indicate a write access and a logical LOW may indicate a read access. Driven on the rising edge of INT_R_CLK.

The DDR memory circuit 120*a* may use the following signals:

Clock (e.g., DDRCK)—N/A

The signal DDRCK along with a signal DDRCKn may be differential clock outputs. All address and control input signals may be sampled on the crossing of the positive edge of DDRCK and negative edge of DDRCKn. (The signals DDRCK and DDRCKn may not have an actual interface to the DDR memory controller circuit but may be included here for completeness.)

Clock Inverted (e.g., DDRCKn)—N/A

See the description for the signal DDRCK. (The signals DDRCK and DDRCKn may not have an actual interface to the DDR memory controller circuit but may be included here for completeness.)

Clock Enable (e.g., DDRCKE)—Out

Clock Enable high may activate and clock enable low deactivate internal clock signals, device input buffers, and output drivers within the memory chip. Taking clock enable low provides a Self Refresh operation. The enable may be synchronous for all cases. The enable may be maintained high throughout all read and write accesses. Memory chip input buffers, excluding CKE may be disabled during a Self Refresh.

DDR Chip Select (e.g., DDRCSn[7:0])—Out

All commands to the memory chip may be masked when the chip select signal is high. The signal may be considered part of a command code along with signals DDRRASn, DDRCASn, and DDRWEn.

Row Address Select (e.g., DDRRASn)—Out

The signal DDRRASn may be part of a command input signal. The signals DDRRASn, DDRCASn, DDRWEn, and DDRCSn generally define the command being sent to the memory chips.

Column Address Select (e.g., DDRCASn)—Out

The signal DDRCASn may be part of a command input signal. The signals DDRRASn, DDRCASn, DDRWEn, and DDRCSn generally define the command being sent to the memory chips.

Write Enable (e.g., DDRWEn)—Out

The signal DDRWEn may be part of a command input signals. The signals DDRRASn, DDRCASn, DDRWEn, and DDRCSn generally define the command being sent to the memory chips.

Bank Address [1:0] (e.g., DDRBA)—Out

The bank address signals may define to which one of the several banks, within the memory chip, an Active, Read, Write or Precharge command is being applied.

Address Bus [12:0] (e.g., DDRADRS)—Out

The address signals may provide to the memory chips the row address for Active commands, and column address and Auto Precharge bit for read/write commands, to select one location out of the memory array in the respective bank. Bit 10 may be sampled during a Precharge command to determine whether the Precharge applies to one bank (e.g., bit 10 low) or all banks (e.g., bit 10 high). If only one bank is to be precharged, the bank may be selected by the DDRBA bits. The address input may also provide the opcode during a Mode Register Set command with DDRBA determining which register may be loaded.

Data Input/Output Bus [X:0] (e.g., DDRDQ)—In/Out

A bidirectional data bus for the memories.

Data Strobe [X:0] (e.g., DDRDQS)—In/Out

Bidirectional bus for the data strobes. The memory chip may drive the strobes, edge-aligned with the data for reads. The DDR controller should drive the strobes, centered in the data for writes. One strobe per byte may be provided.

Data Mask [3:0] (e.g., DDRDM)—Out

Write data may be masked (not written) when the signal DM is sampled high along with the write data (e.g., DQ bus). The signal DM may be sampled on both edges of the signal DDRDQS. One mask per byte may be provided.

Voltage Reference (e.g., DDRVREF)—In

Provides the SSTL2 reference voltage. The signal DDRVREF should not be buffered.

DDR Flip-Flop in I/O (e.g., DDRFFINIO)—In

When the single clock rate signals (e.g., DDRCKE, DDRCSn, DDRRASn, DDRCASn, DDRWEn, DDRBA, and DDRADRS) to the DDR memories use a SSTL2 I/O buffer that includes a flip-flop, the signal DDRFFINIO may be tied high. When a standard SSTL2 I/O cell is used for the signals (without a flip-flop), the signal DDRFFINIO may be tied low. The DDR memory controller circuit may use the level of the signal to modify the length of a pipeline registers to compensate for the existence of absence of a flip-flop in the I/O buffers.

Figure 7:
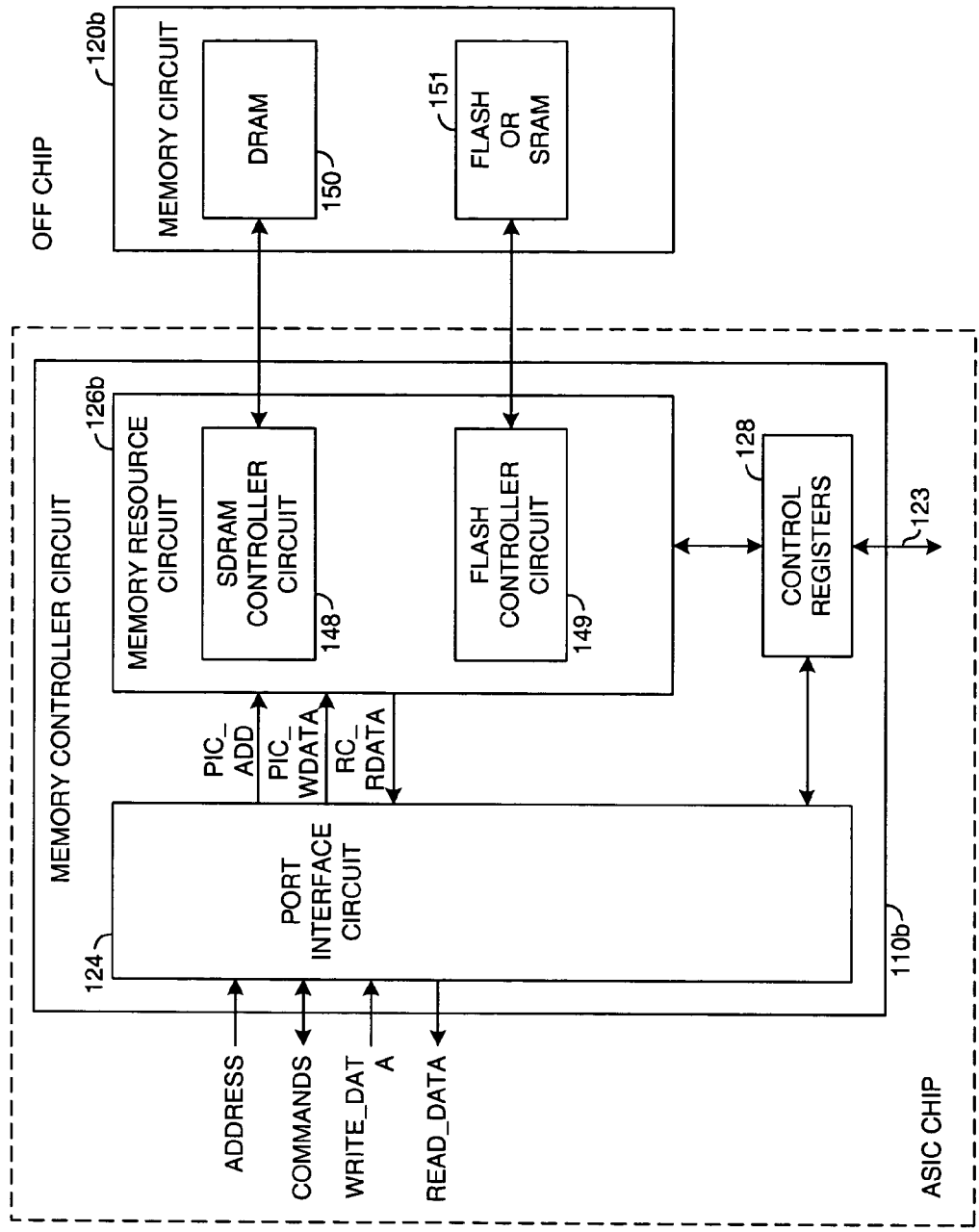
FIG. 7 is a block diagram of a second embodiment of the peripheral controller circuit.

Referring to FIG. 7, a block diagram of a second embodiment of the peripheral controller circuit 110 is shown. The peripheral controller circuit 110 may be implemented as an off-chip memory controller circuit 110b. In the case of single data rate (SDR) or DDR SDRAMs, the peripheral circuit 120 may be implemented off-chip as a discrete memory device or circuit 120b. The external peripheral interface circuit 114 may be absent in the instant implementation. The port interface circuit 124 within the off-chip memory controller circuit 120b may be configured as described earlier. The resource circuit 126 may be configured as a synchronous dynamic random access memory (SDRAM) controller circuit or block 148 and a flash memory controller circuit or block 149. The peripheral circuit 120b may be configured as a dynamic random access memory (DRAM) circuit or block 150 and a flash memory circuit or block 151. Other memory technologies and corresponding controllers may be implemented to meet a criteria of a particular application.

Figure 8:
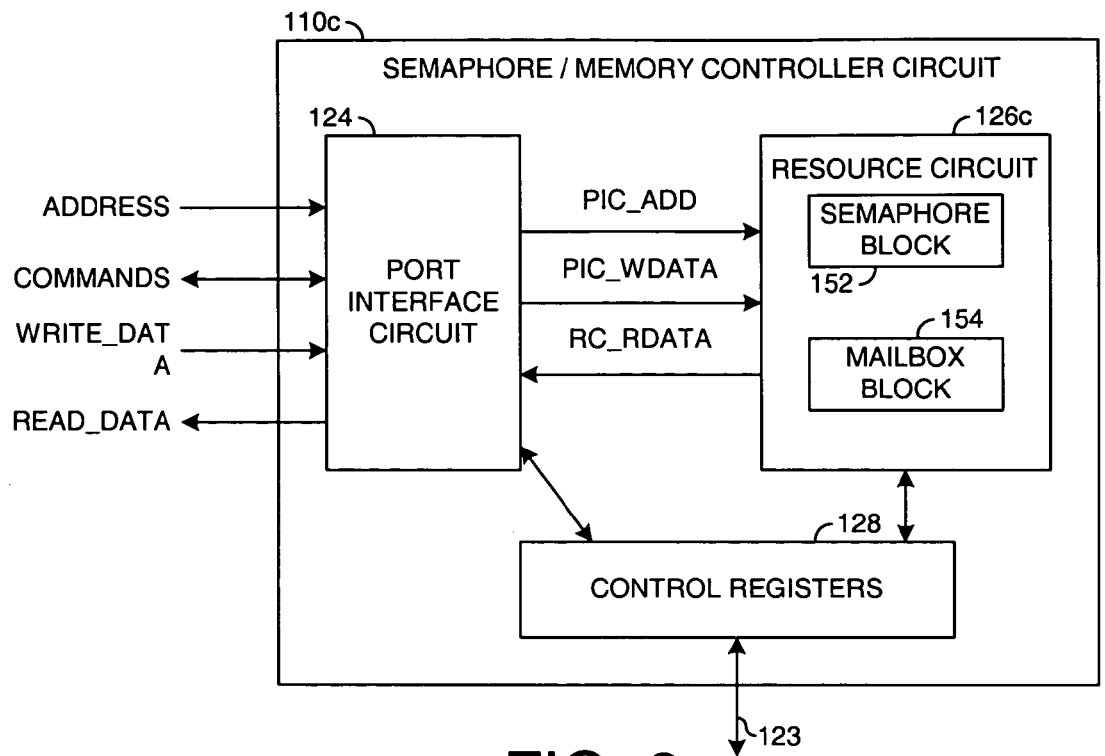
FIG. 8 is a block diagram of a third embodiment of the peripheral controller circuit.

Referring to FIG. 8, a block diagram of a third embodiment of the peripheral controller circuit 110 is shown. The peripheral controller circuit 110 may be implemented as a semaphore/mailbox controller circuit 110c. The semaphore/mailbox controller circuit 110c generally comprises the port interface circuit 124, a semaphore block or circuit 152 and a mailbox block or circuit 154. The semaphore block 152 and the mailbox block 154 generally support inter-processor communications and semaphore functions. The mailbox block 154 may include a simple set of control and status registers that may be used to communicate simple control and/or status functions between processors. The semaphore block 152 and the mailbox block 154 may be separate functions. However, since mailbox function may be used in multiprocessor environments the same as semaphore functions, both blocks 152 and 154 may be likely used together.

Figure 9:
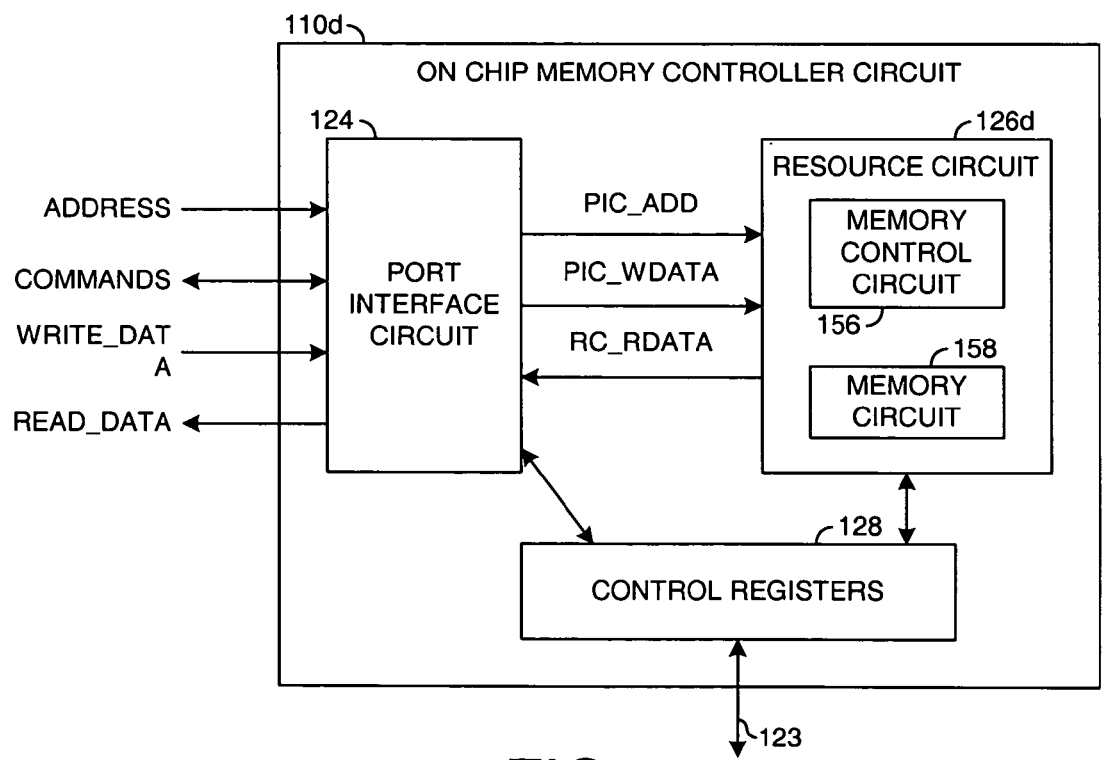
FIG. 9 is a block diagram of a fourth embodiment of the peripheral controller circuit.

Referring to FIG. 9, a block diagram of a fourth embodiment of the peripheral controller circuit 110 is shown. The peripheral controller circuit 110 may be implemented as an on-chip memory controller circuit 110d. The on-chip memory controller circuit 110d generally comprises the port interface circuit 124, a memory controller circuit or block 156 and a memory circuit or block 158. In the instant embodiment, the external physical interface circuit 114 and the peripheral circuit 120 may be omitted. All memory storage functionality may be allocated to the on-chip memory controller circuit 110d itself.

Figure 10:
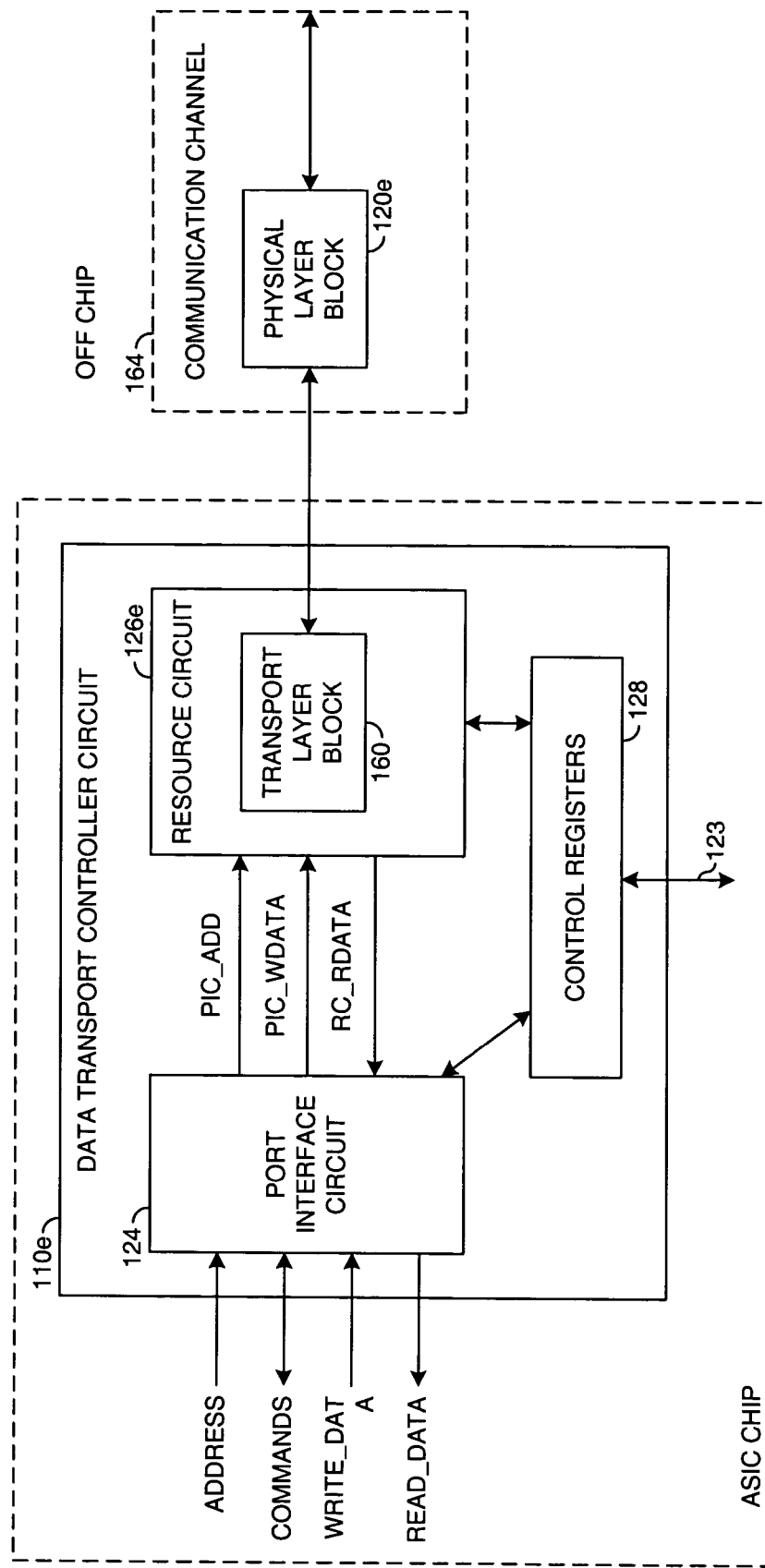
FIG. 10 is a block diagram of a fifth embodiment of the peripheral controller circuit.

Referring to FIG. 10, a block diagram of a fifth embodiment of the peripheral controller circuit 110 is shown. The peripheral controller circuit 110 may be implemented as a data transport circuit 110e. The data transport circuit 110e generally comprises the port interface circuit 124 and a transport layer block or circuit 160. The peripheral circuit 120 may be implemented as a physical layer block or circuit 120e. The physical layer block 120e may be implemented as a transceiver circuit within a communications channel 164. The transport layer block 160 generally provides framing and de-framing capabilities to the system 100 to allow transfers of data via the communications channel 164.

Figure 11:
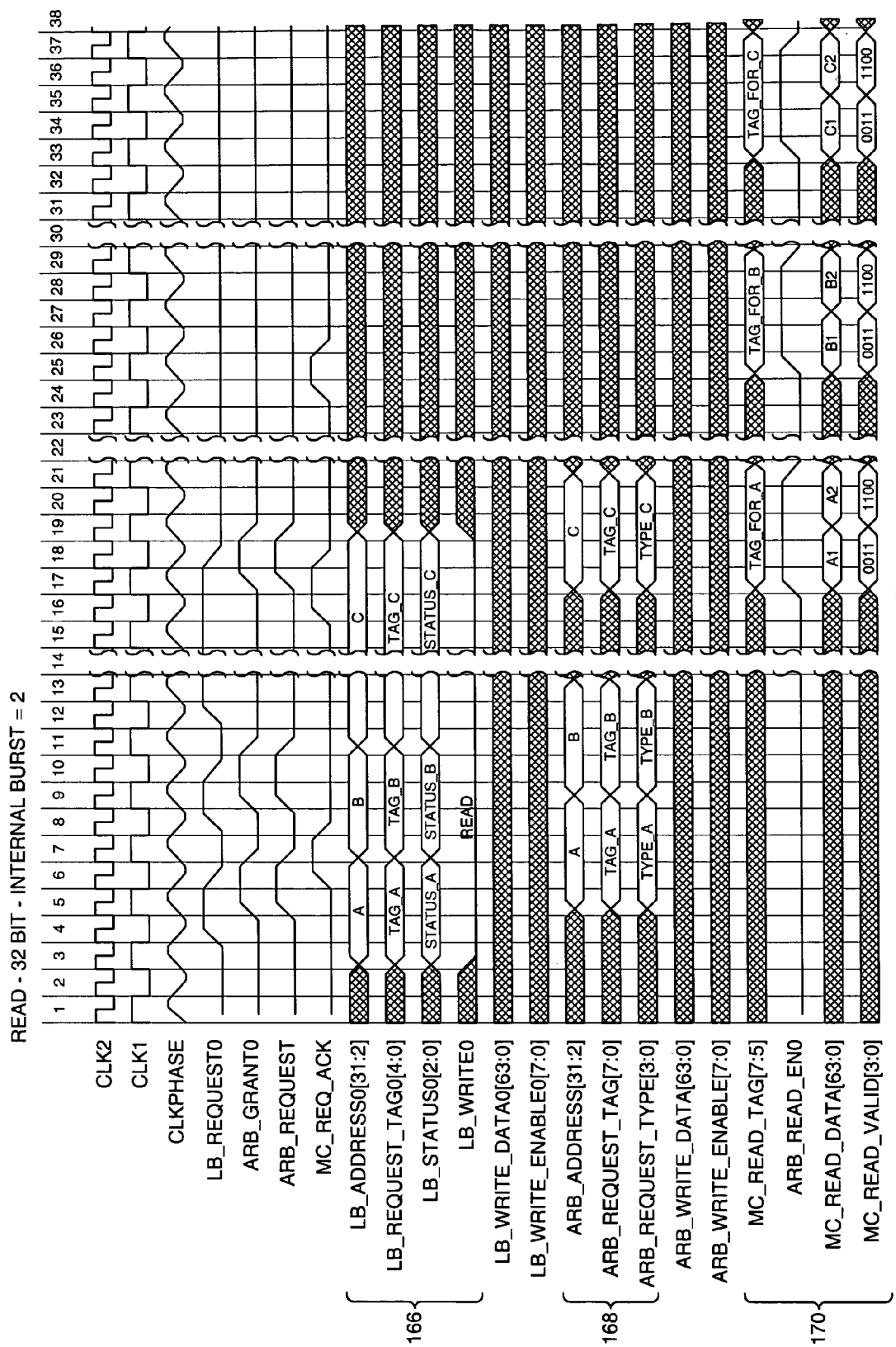
FIG. 11 is a timing diagram of an example two burst read from the peripheral controller circuit.

Referring to FIG. 11, a timing diagram of an example two burst read from the peripheral controller circuit 110 is shown. A line buffer circuit (e.g., 102a) may generate a set of read request signals 166 that may be provided to the multiplexer circuit 108. The multiplexer circuit 108 may route the read request signals 168 to the peripheral controller circuit 110. The peripheral controller circuit 110 may service the read request by providing data in two bursts 170 for each request back to the requesting line buffer circuit 102a.

Figure 12:
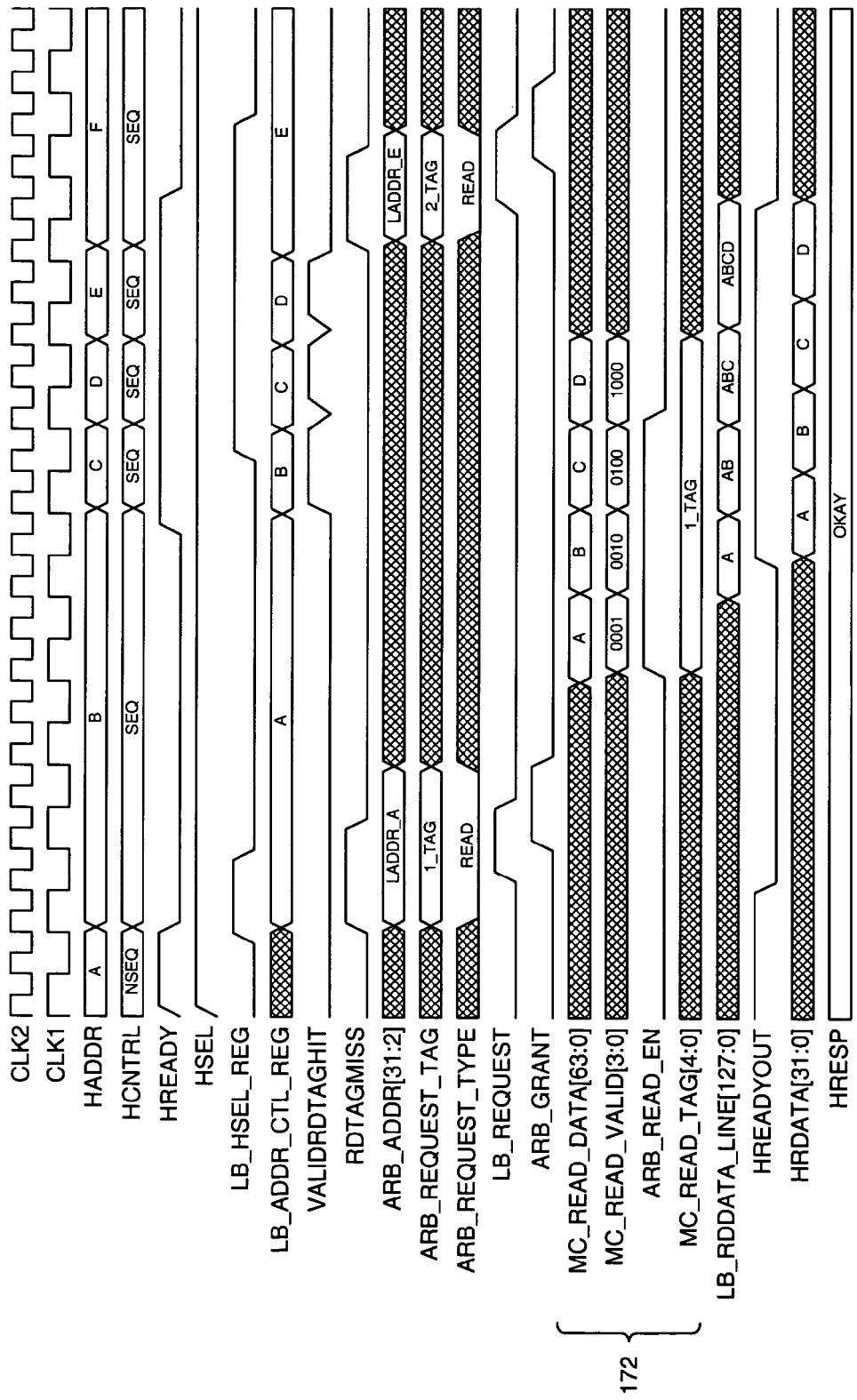
FIG. 12 is a timing diagram of an example four burst read from the peripheral controller circuit.

Referring to FIG. 12, a timing diagram of an example four burst read from the peripheral controller circuit 110 is shown. A line buffer circuit (e.g., 102a) may request data at several address (e.g., A-D) and provide an associated 5-bit tag value (e.g., 1-TAG). The arbiter circuit 106 may generate an 8-bit tag for the address A read request. The peripheral controller circuit 110 may respond to the read request by transferring data for addresses A, B, C and D along with the tag value 1_TAG to the line buffer circuits 102a-d in a burst of four consecutive transfers 172.

Figure 13:
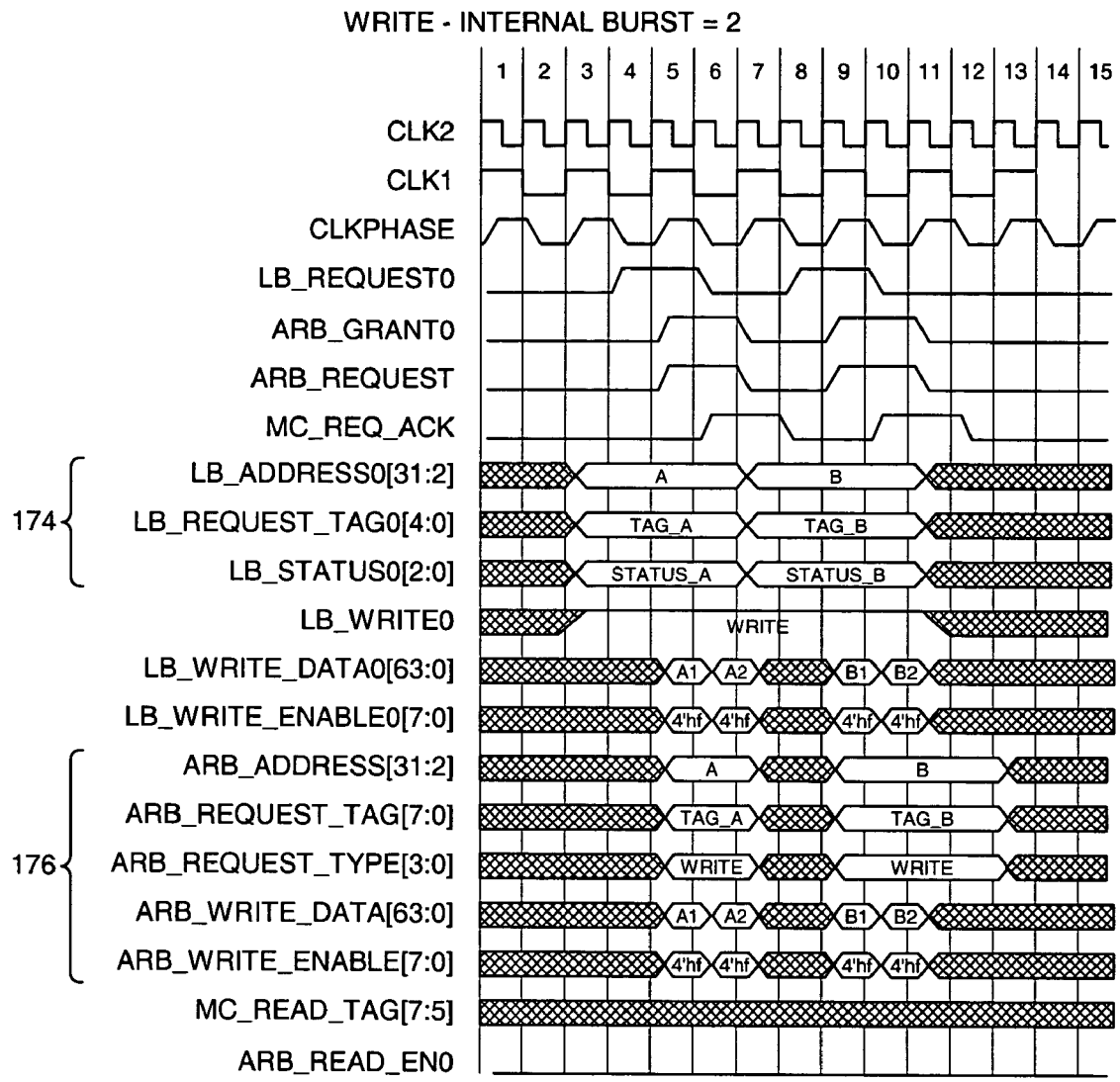
FIG. 13 is a timing diagram of an example two burst write to the peripheral controller circuit.

Referring to FIG. 13, a timing diagram of an example two burst write to the peripheral controller circuit 110 is shown. A line buffer circuit (e.g., 102a) may request 174 writing data to two addresses (e.g., addresses A and B). When the peripheral controller circuit 110 is ready (e.g., MC_REQ_ACK=high), the arbiter circuit 106 may first write two data values (e.g., A1 and A2) to the peripheral controller circuit 110 at address A in a two burst transfer 174. When the peripheral controller circuit 110 may be ready for the data at the address B, the arbiter circuit 106 may write two additional data values (e.g., B1 and B2) to the peripheral controller circuit 110 at the address B in another two burst transfer 174.

Figure 14:
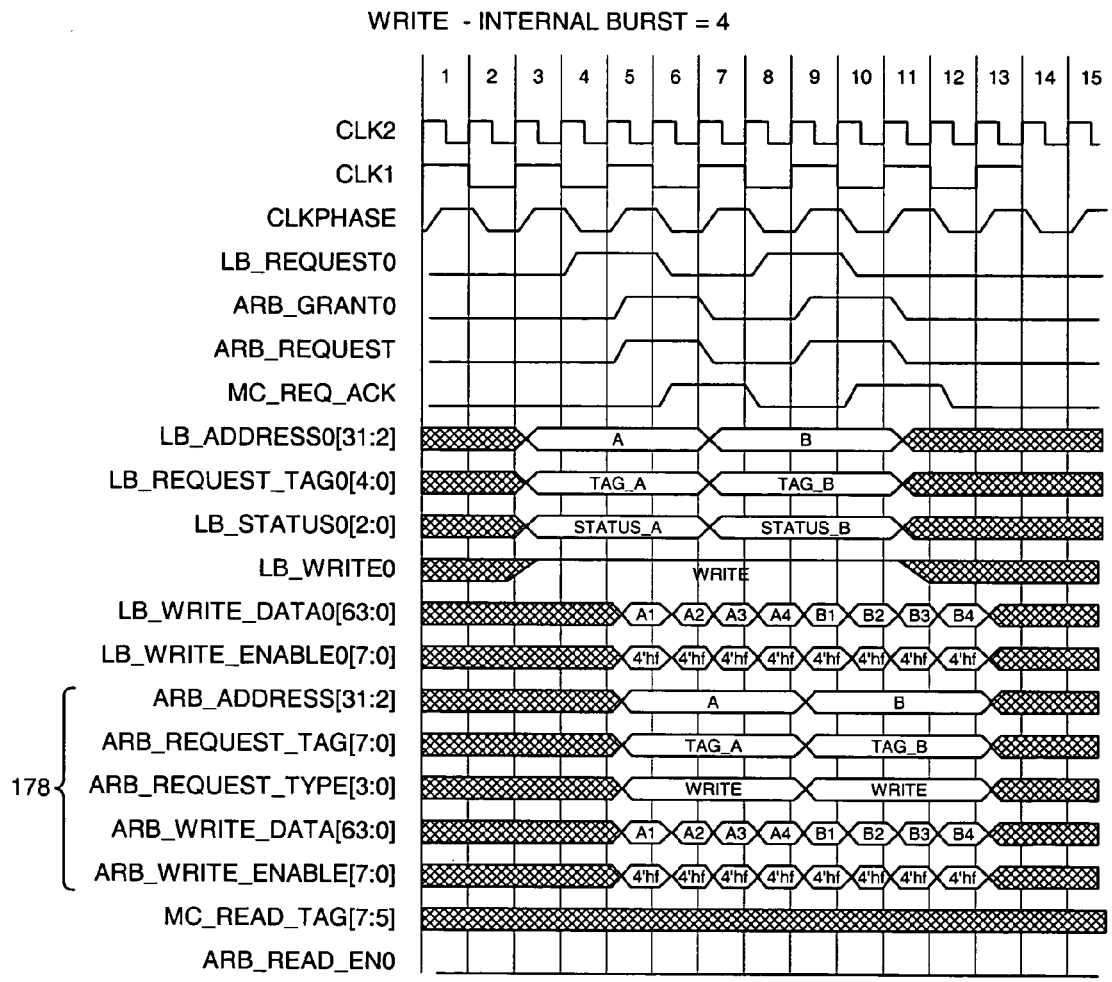
FIG. 14 is a timing diagram of an example four burst write to the peripheral controller circuit.

Referring to FIG. 14, a timing diagram of an example four burst write to the peripheral controller circuit 110 is shown. The arbiter circuit 106 may transfer data values (e.g., A1-A4) to the peripheral controller circuit 110 in four consecutive transfers 178 under a tag value (e.g., TAG_A). Four additional transfers 178 of data values (e.g., B1-B4) under another tag value (e.g., TAG_B) may happen immediately after the data value A4 has been written.

Figure 15:
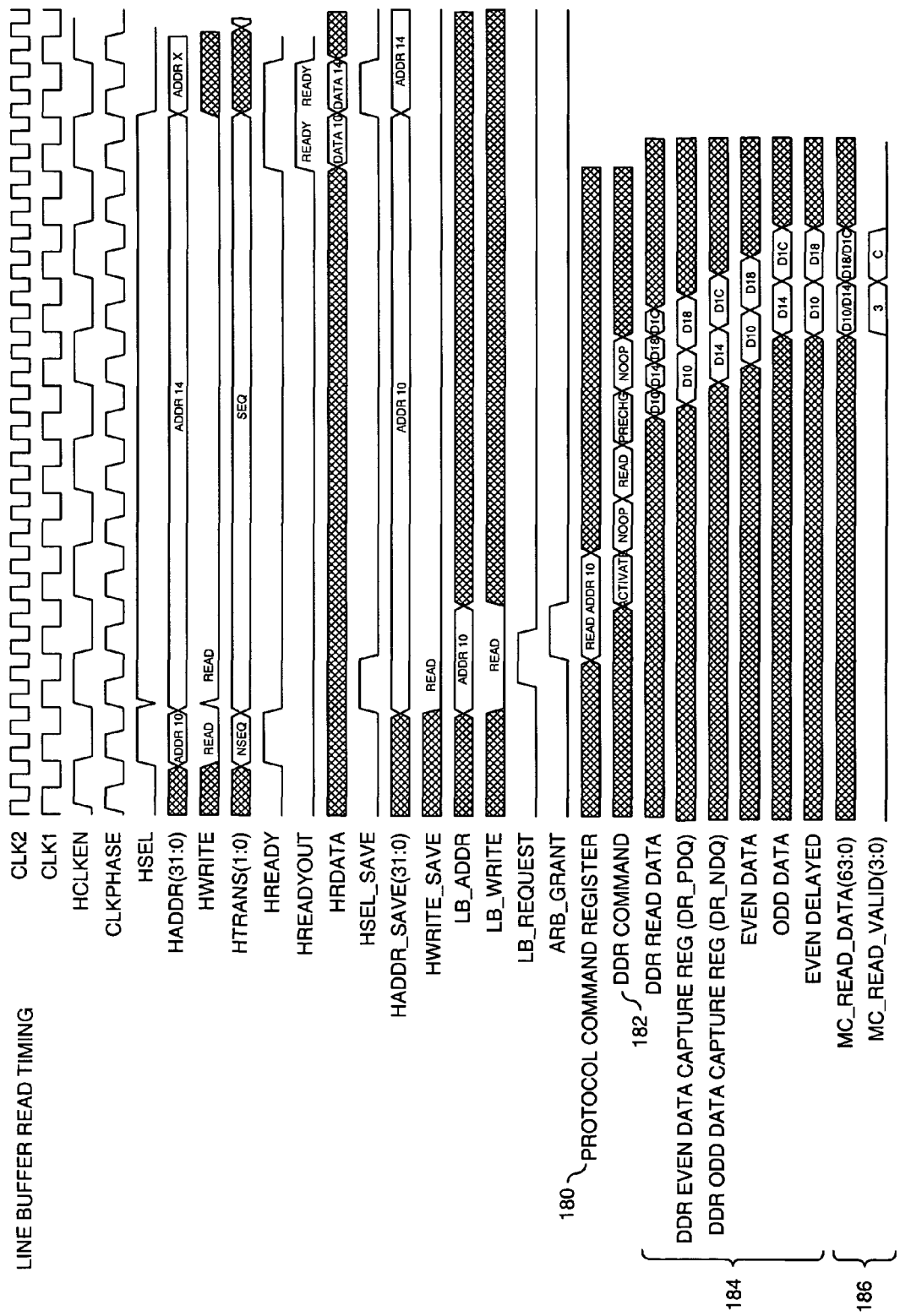
FIG. 15 is a timing diagram of an example read from a double data rate (DDR) memory circuit.

Referring to FIG. 15, a timing diagram of an example read from the DDR memory circuit 120a (FIG. 6) is shown. The command buffer and control circuit 136 may receive a read request 180 at an address (e.g., address 10). The state machine 142 and the programmable physical timing circuit 144 may generate a set of DDR command signals 182 to the DDR memory circuit 120a to service the read request. The DDR memory circuit 120a may respond to the DDR commands by transferring 184 data from the addresses 10-1C (hexadecimal) to the read buffer circuit 140. The DDR memory controller circuit 110a may then transfer the requested data, and additional data, to the line buffer circuits 102a-d in two burst transfers 186.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A system comprising:
   a plurality of first controller circuits each configured to generate a plurality of control signals that control storage of data in a corresponding one of a plurality of peripheral devices;
   a plurality of line buffer circuits each (i) connected to a different one of a plurality of first busses in a one-to-one relationship as a bus slave having a write data bus interface and a read data bus interface and (ii) configured to transfer said data bi-directionally between an accessed one of said first controller circuits and said respective first bus while access is granted;
   a first arbiter circuit configured to arbitrate access to said first controller circuits by said line buffer circuits in response to a plurality of requests initiated by said line buffer circuits; and
   a configuration circuit configured to receive configuration data from a second bus and send said configuration data directly to (i) said line buffer circuits, (ii) said first arbiter circuit and (iii) said first controller circuits.

2. The system according to claim 1, further comprising:
   at least one second controller circuit; and
   a second arbiter circuit configured to arbitrate access to said second controller circuit by all of said line buffer circuits.

3. The system according to claim 2, wherein at least two of said line buffer circuits are granted access to (i) at least one of said first controller circuits and (ii) said second controller circuit both concurrently and independently of each other.

4. The system according to claim 2, wherein said second arbiter circuit cannot grant access to any of said first controller circuits.

5. The system according to claim 4, wherein said second arbiter circuit is further configured to accept access requests from all of said line buffer circuits.

6. The system according to claim 1, wherein said first arbiter circuit has a programmable arbitration priority scheme.

7. A system comprising:
   a plurality of controller circuits each configured to generate a plurality of control signals that control storage of data in a corresponding one of a plurality of peripheral devices;
   a plurality of line buffer circuits each configured (i) to transfer said data bi-directionally between an accessed one of said controller circuits and one of a plurality of first busses and (ii) to operate as a bus slave having a write data bus interface and a read data bus interface, wherein each of said first busses comprises a multi-drop bus;
   a plurality of arbiter circuits each configured to control access to a different subset of said controller circuits by all of said line buffer circuits in response to a plurality of requests initiated by said line buffer circuits; and
   a configuration circuit configured to receive configuration data from a second bus and send said configuration data directly to at least one of said line buffer circuits, said configuration data programming said at least one line buffer circuit.

8. The system according to claim 7, wherein at least two of said line buffer circuits access at least two of said controller circuits concurrently.

9. The system according to claim 7, wherein access to at least two of said controller circuits is arbitrated by one of said arbiter circuits.

10. The system according to claim 7, wherein said configuration circuit is further configured to send said configuration data to at least one of said arbiter circuits, said configuration data programming said at least one arbiter circuit.

11. The system according to claim 7, wherein said configuration circuit is further configured to send said configuration data to at least one of said controller circuits, said configuration data programming said at least one controller circuit.

12. The system according to claim 7, wherein each of said line buffer circuits (i) is connected to a different one of said first busses in a one-to-one relationship and (ii) transfers said data between said accessed one of said controller circuits and said respective first bus while access is granted.

13. The system according to claim 7, wherein at least one of said arbiter circuits is further configured to grant access among a subset of said controller circuits, said subset comprising less than all of said controller circuits.

14. A method of accessing a plurality of first controller circuits, comprising the steps of:
   (A) arbitrating access to said first controller circuits by a plurality of line buffer circuits using a first arbiter circuit in response to a plurality of requests initiated by said line buffer circuits, each of said line buffer circuits being connected to a different one of a plurality of first busses in a one-to-one relationship as a bus slave having a write data bus interface and a read data bus interface and each of said first controller circuit is configured to generate a plurality of control signals that control storing data in a corresponding one of a plurality of peripheral devices;
   (B) transferring said data between an accessed one of said first controller circuits and said respective first bus through said line buffer circuits while access is granted, wherein said line buffer circuits are configured for bi-directional transfers between said first controller circuits and said first busses;

(C) receiving configuration data from a second bus; and (d) transferring said configuration data directly to (i) said line buffer circuits, (ii) said first arbiter circuit and (iii) said first controller circuits.

15. The method according to claim 14, further comprising the step of:

arbitrating access to at least one second controller circuit by all of said line buffer circuits using a second arbiter circuit.

16. The method according to claim 15, wherein at least two of said line buffer circuits access (i) at least one of said first controller circuits and (ii) said second controller circuit both concurrently and independently of each other.

17. The method according to claim 15, wherein said second arbiter circuit cannot grant access to any of said first controller circuits.

18. A system comprising:

a plurality of first controller circuits each configured to generate a plurality of control signals that control storage of data in a corresponding one of a plurality of peripheral devices;

a plurality of line buffer circuits each (i) connected to a different one of a plurality of first busses in a one-to-one relationship as a bus slave having a write data bus interface and a read data bus interface and (ii) configured to transfer said data bi-directionally between an accessed one of said first controller circuits and said respective first bus while access is granted;

a first arbiter circuit configured to arbitrate access to said first controller circuits by said line buffer circuits in response to a plurality of requests initiated by said line buffer circuits; and a configuration circuit configured to receive configuration data from a second bus and send said configuration data directly to (i) said line buffer circuits, (ii) said first arbiter circuit and (iii) said first controller circuits.

19. A system comprising:

a plurality of controller circuits each configured to generate a plurality of control signals that control storage of data in a corresponding one of a plurality of peripheral devices;

a plurality of line buffer circuits each configured (i) to transfer said data bi-directionally between an accessed one of said controller circuits and one of a plurality of first busses and (ii) to operate as a bus slave having a write data bus interface and a read data bus interface, wherein each of said first busses comprises a multi-drop bus;

a plurality of arbiter circuits each configured to control access to a different subset of said controller circuits by all of said line buffer circuits in response to a plurality of requests initiated by said line buffer circuits; and a configuration circuit configured to receive configuration data from a second bus and send said configuration data directly to at least one of said controller circuits, said configuration data programming said at least one controller circuit.

20. A method of accessing a plurality of first controller circuits, comprising the steps of:

(A) arbitrating access to said first controller circuits by a plurality of line buffer circuits using a first arbiter circuit in response to a plurality of requests initiated by said line buffer circuits, each of said line buffer circuits being connected to a different one of a plurality of first busses in a one-to-one relationship as a bus slave having a write data bus interface and a read data bus interface and each of said first controller circuit is configured to generate a plurality of control signals that control storing data in a corresponding one of a plurality of peripheral devices;

(B) transferring said data between an accessed one of said first controller circuits and said respective first bus through said line buffer circuits while access is granted, wherein said line buffer circuits are configured for bi-directional transfers between said first controller circuits and said first busses;

(C) receiving programming data from a second bus; and (D) transferring said programming data directly to (i) said line buffer circuits, (ii) said first arbiter circuit and (iii) said first controller circuits.

* * * * *